United States Patent [19]

Hiigli

[11] Patent Number: 5,249,966
[45] Date of Patent: Oct. 5, 1993

[54] GEOMETRIC BUILDING BLOCK SYSTEM EMPLOYING SIXTEEN BLOCKS, EIGHT EACH OF ONLY TWO TETRAHEDRAL SHAPES, FOR CONSTRUCTING A REGULAR RHOMBIC DODECAHEDRON

[76] Inventor: John A. Hiigli, 164 W. 83rd St., #1-R, New York, N.Y. 10024

[21] Appl. No.: 977,263

[22] Filed: Nov. 16, 1992

Related U.S. Application Data

[63] Continuation-in-part of Ser. No. 798,540, Nov. 26, 1991, abandoned.

[51] Int. Cl.$^5$ .............................................. G09B 5/00
[52] U.S. Cl. ...................................................... 434/211
[58] Field of Search ............... 434/211, 212, 188, 208, 434/403

[56] References Cited

U.S. PATENT DOCUMENTS

| | | | |
|---|---|---|---|
| 595,782 | 12/1897 | Morsell | 434/211 |
| 3,461,574 | 7/1967 | Larsen et al. | 35/73 |
| 3,645,535 | 2/1972 | Randolph | 434/403 X |
| 3,659,360 | 5/1972 | Zeischegg | 434/403 |
| 4,258,479 | 3/1981 | Roane | 434/211 |
| 4,317,654 | 3/1982 | Wahl | 434/211 |
| 4,334,870 | 6/1982 | Roane | 434/403 X |
| 4,334,871 | 6/1982 | Roane | 434/403 X |

Primary Examiner—John J. Wilson
Assistant Examiner—Jeffrey A. Smith
Attorney, Agent, or Firm—Parmelee, Bollinger & Bramblett

[57] ABSTRACT

A geometric block system for constructing a regular rhombic dodecahedron having twelve identical rhombic faces, the system consisting of eight identical first blocks each being one-quarter of a regular tetrahedron and eight identical second blocks each being one-eights of a regular octahedron. The regular tetrahedron has six edges of length "a" and four identical equilateral triangular faces with sides of length "a". Each first block has one cubic unit of volume and has an apex at a point corresponding with the center of gravity of the tetrahedron and has first, second, third and fourth triangular faces. The first face is equilateral triangular with edges of length $\int a$"; the second, third and fourth faces are isosceles triangular with one edge of length "a" and two edges of length "b" equal to a $\sqrt{6}/4$. The regular octahedron has eight edges of length "a" and eight identical equilateral triangular faces with sides of length "a". Each second block has two cubic units of volume and has an apex at a point corresponding with the center of gravity of said octahedron and has fifth, sixth, seventh and eighth triangular faces. The fifth face is equilateral triangular with edges of length "a"; the sixth, seventh and eighth faces are isosceles triangular with one edge of length "a" and two edges of length "c" equal to a/$\sqrt{2}$. Each identical rhombic face has four edges of length "b". The first and second blocks may be assembled from respective subdivision blocks as described.

18 Claims, 25 Drawing Sheets

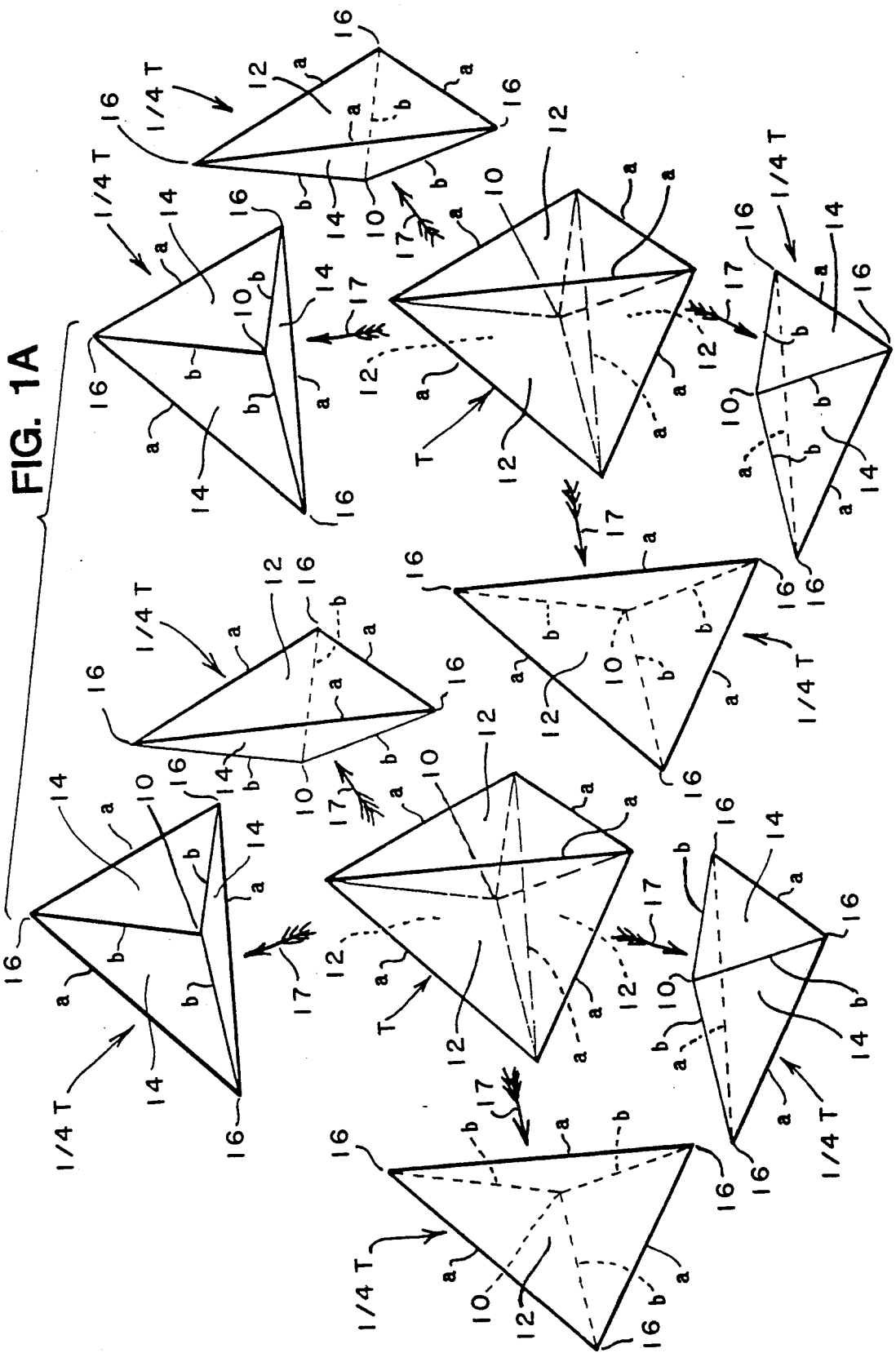

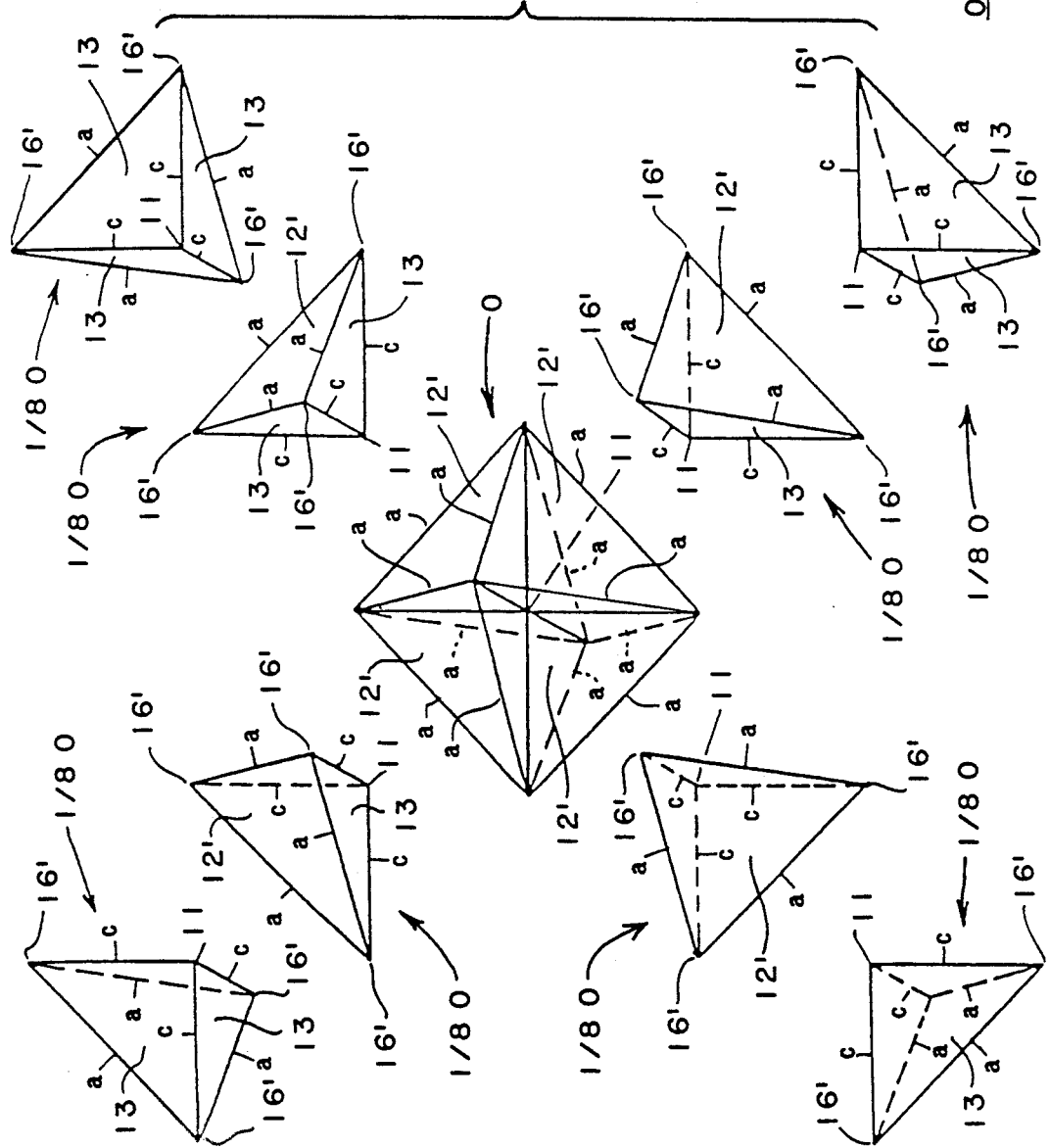
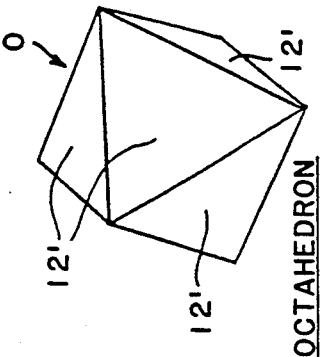

RATIO: $\dfrac{x}{y} = \dfrac{2}{1}$ $y = a/2\sqrt{6}$
$x = a/\sqrt{6}$
$n = a/\sqrt{3}$ RATIO: $\dfrac{x}{y} = \dfrac{2}{1}$ $x^2 = (a/2)^2 - k^2$
$x = a/\sqrt{6}$ $b = a\sqrt{6}/4$
$w = a/2\sqrt{2}$

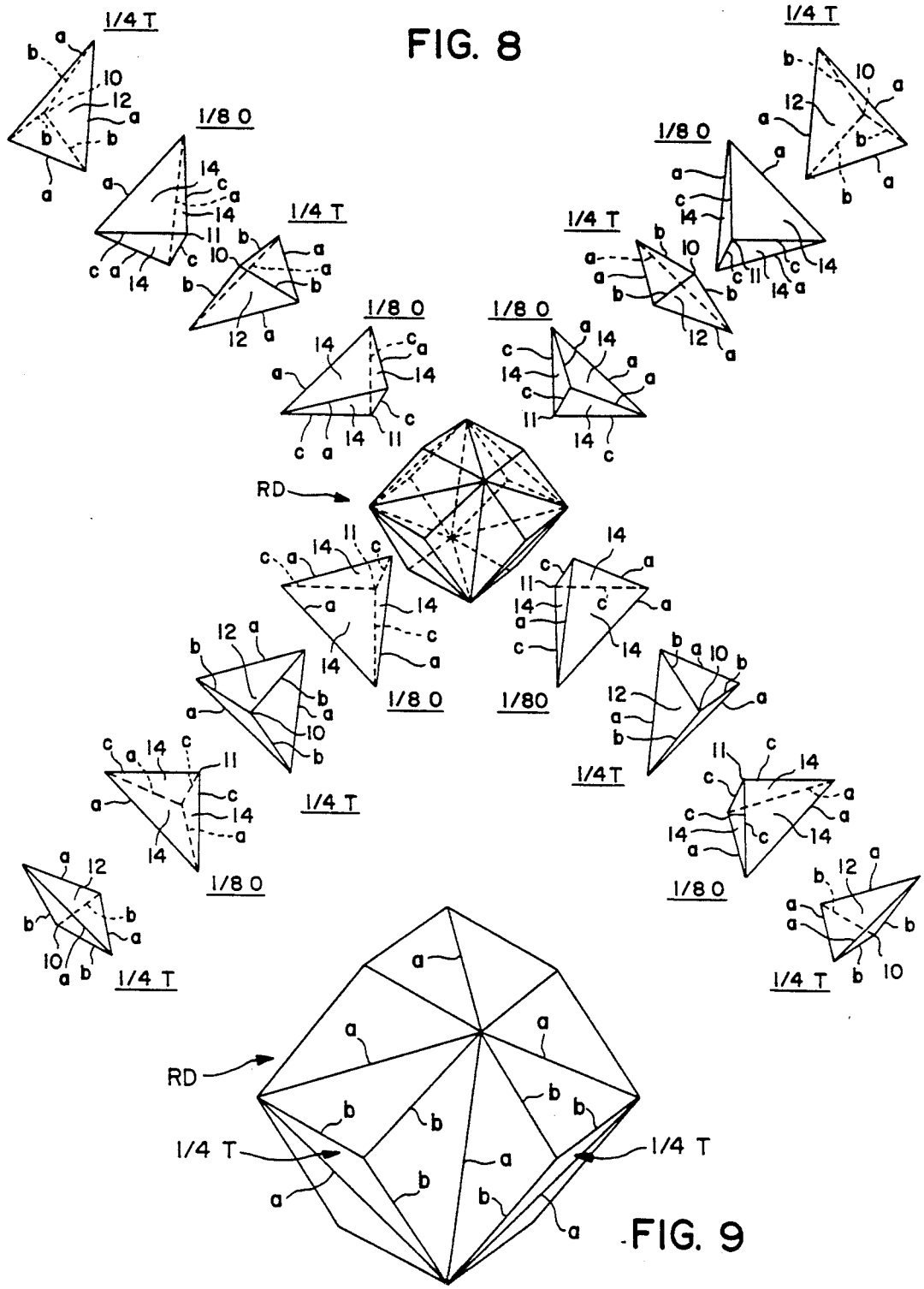

$h = a\sqrt{3}/2$
$k = a/2\sqrt{3}$
$n = h-k = a/\sqrt{3}$
$m = a\sqrt{2}/\sqrt{3}$
$y = a/2\sqrt{6}$

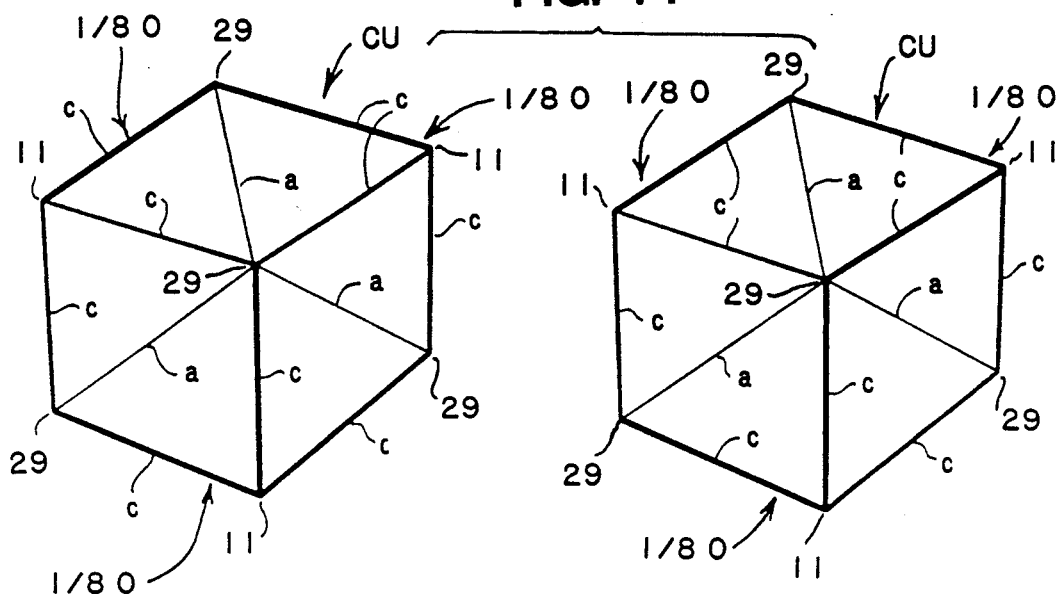
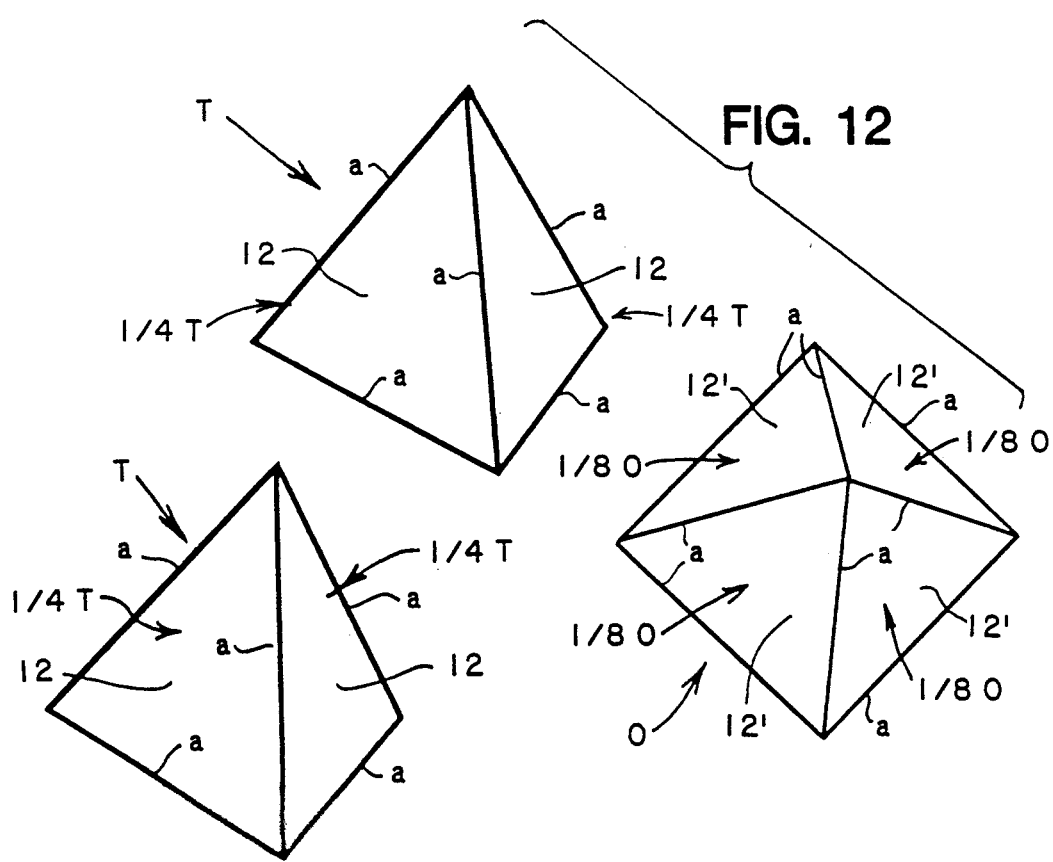

DUO-TETRAHEDRON 32 1/4 T BLOCKS + 8 1/8 O BLOCKS

RHOMBIC DODECAHEDRON

CUBOCTAHEDRON 32 1/4 T BLOCKS + 24 1/8 O BLOCKS

COMPLEX CUBE 32 1/4 T BLOCKS + 32 1/8 O BLOCKS
CUBOCTAHEDRON STATE

COMPLEX CUBE 32 1/4 T BLOCKS + 32 1/8 O BLOCKS
DUO-TETRAHEDRON STATE

LCD 1/8 OCTAHEDRON

FIG. 25
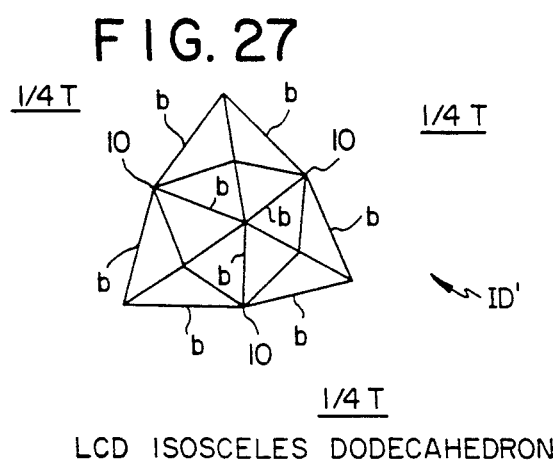
LCD UNIT CUBE
FIG. 26
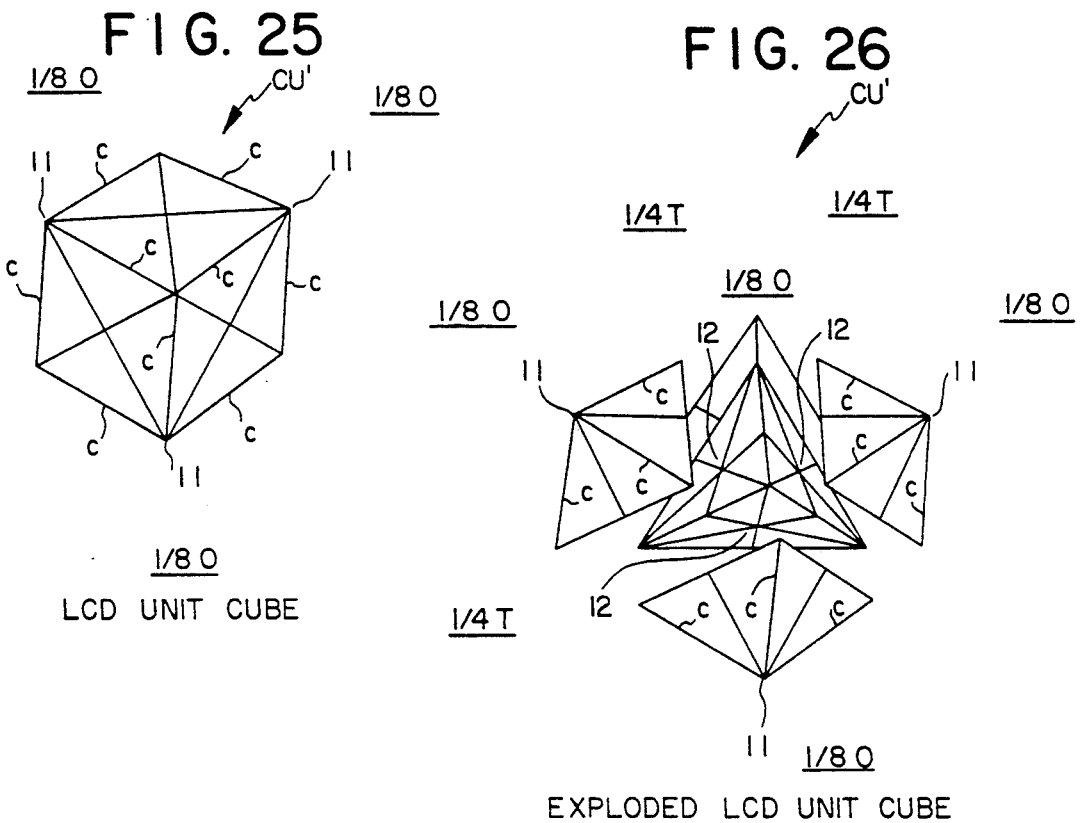
EXPLODED LCD UNIT CUBE
FIG. 27
LCD ISOSCELES DODECAHEDRON

LCD RHOMBIC DODECAHEDRON
TETRAHEDRON CORED

LCXCU
576 LCD BLOCKS

LCXCU'
576 LCD BLOCKS

CUO'
480 LCD BLOCKS

DT'
288 LCD BLOCKS

DRD'
288 LCD BLOCKS

LRD'
144 LCD BLOCKS

RD'
144 LCD BLOCKS

O'
96 LCD BLOCKS

FIG. 30
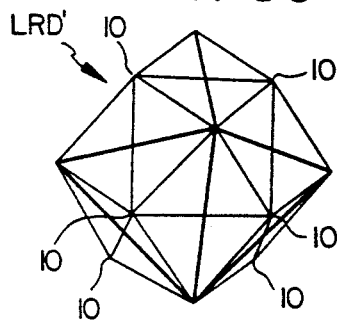
LCD RHOMBIC DODECAHEDRON OCTAHEDRON CORED
FIG. 31 (FIG. 30 EXPLODED)
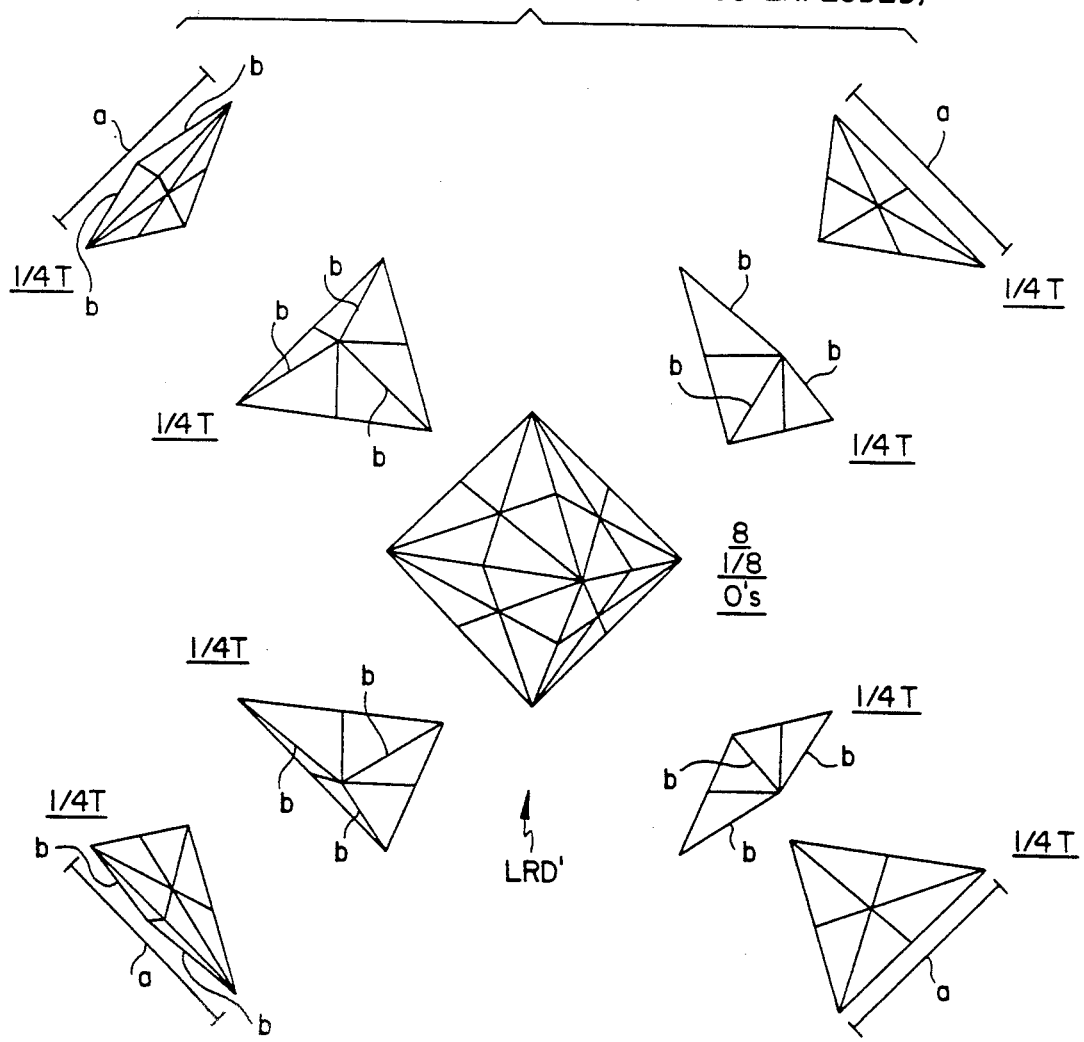

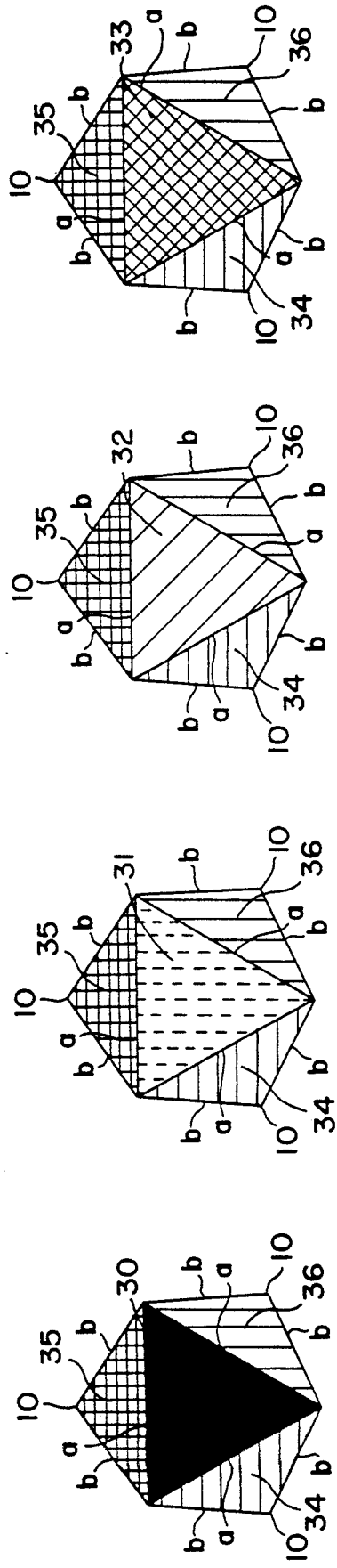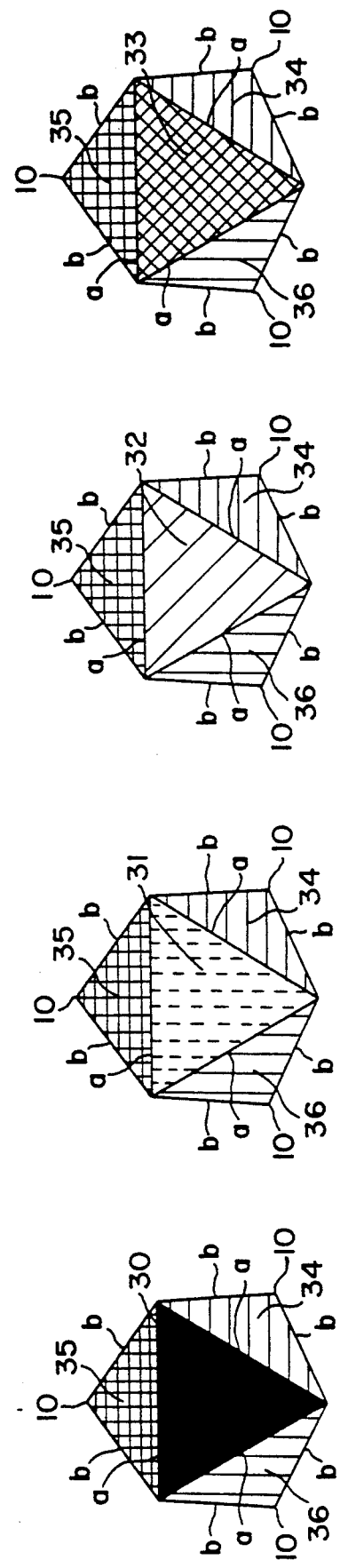
FIG. 40A

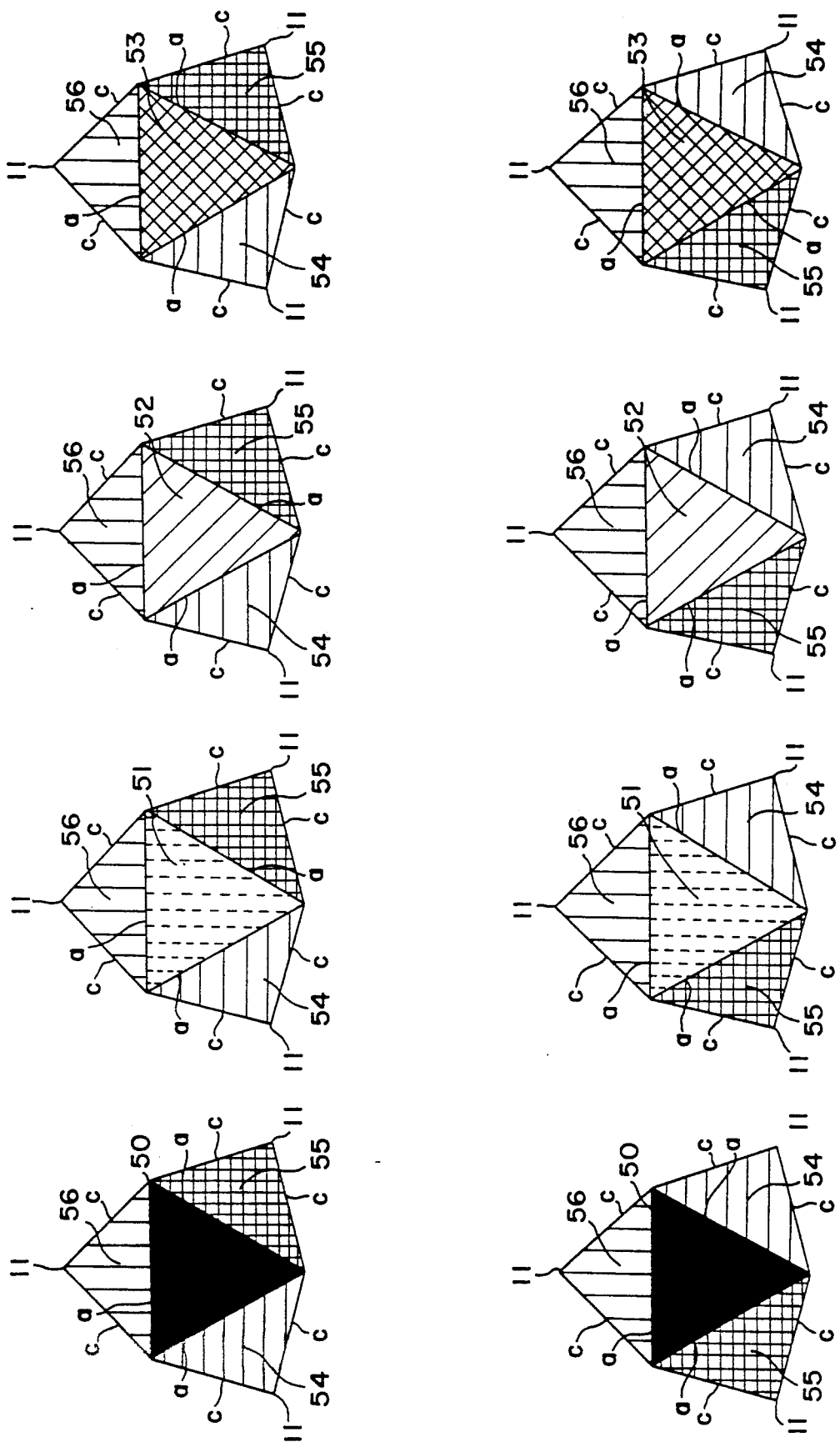

GEOMETRIC BUILDING BLOCK SYSTEM EMPLOYING SIXTEEN BLOCKS, EIGHT EACH OF ONLY TWO TETRAHEDRAL SHAPES, FOR CONSTRUCTING A REGULAR RHOMBIC DODECAHEDRON

RELATED PATENT APPLICATION

The present patent application is a Continuation-in-Part of copending patent application Ser. No. 07/798,540 Filed on Nov. 26, 1991, now abandoned.

BACKGROUND OF THE INVENTION

Field of the Invention

The invention described herein relates to geometrical blocks which for educational purposes may be assembled in different combinations to form a variety of geometric structures. More particularly the invention relates to a geometric building block system employing sixteen blocks, eight each of only two tetrahedral shapes, for constructing a regular rhombic dodecahedron and other geometric forms, and wherein these two tetrahedral shapes each have at least one equilateral triangular face; they have a volume ratio of two-to-one; they are both center-of-gravity apexed; and they involve a total of only three different edge lengths.

Description of the Related Art

Using geometric shapes to create other or more complex geometric forms as an educational device has been described in the art. A system using such shapes has distinct educational advantages in respect to teaching a student how to visualize geometric or other mathematical relationships, spatial relationships, and how to manipulate geometrical shapes.

Larsen and Sickler U.S. Pat. No. 3,461,574 describes an educational toy consisting of a series of polyhedra, each of the polyhedral elements of which fits within the next larger polyhedral element in the series. Such a system permits a limited educational experience which is confined to demonstrating the relationships between the polyhedra of increasing size in the series.

Randolph U.S. Pat. No. 3,645,535 describes a geometric block system consisting of a limited number of geometric elements, namely, regular tetrahedra and regular fractional elements of an octahedron, which may be combined to form certain more complex geometrical forms. Randolph makes reference only to polyhedral shapes including cubes, rectangular blocks, pyramids, and the like. It is noted that cubes and rectangular blocks have only six faces, and pyramids have only five faces. Randolph also refers to the tetrahedron, the cube or hexahedron and the octahedron (respectively having four, six and eight faces). Randolph teaches that diagonals and opposite faces of the hexahedron or cube at right angles to each other form the edges of a tetrahedron. Further, the mid-points of the faces of a cube are vertices of an octahedron; and conversely, the mid-points on the faces of an octahedron are vertices of the cube. Randolph does not refer to other aspects of an integrated block construction process, for example, color coordination or connecting means.

It is noted that Randolph's disclosure does not show sixteen tetrahedron blocks all of which have at least one equilateral triangular face. He does not disclose a sixteen-block system wherein three and only three edge lengths are employed, nor a sixteen-block system being used for constructing a regular rhombic dodecahedron, nor disclose a sixteen-block system employing eight each of two tetrahedral shapes and wherein those two tetrahedral shapes have a volume ratio of two-to-one, namely two cubic units versus one cubic unit and wherein said two tetrahedral shapes are both center-of-gravity apexed. In my careful experimentation using blocks having the specific shapes disclosed by Randolph, I have found that it is not possible to construct a regular rhombic dodecahedron employing only sixteen blocks or less. In fact, I believe that it is not even possible to construct a regular rhombic dodecahedron using as many as sixty-four of Randolph's blocks. It is difficult to prove a negative. Thus, my conclusion that it is not even possible to construct a regular rhombic dodecahedron using as many as sixty-four of Randolph's blocks is being set forth as my sincere belief; and I am interested to see if anyone will be able to prove that this conclusion about any sixty-four of Randolph's blocks is incorrect.

Roane U.S. Pat. Nos. 4,258,479, 4,334,870 and 4,334,87 (the latter two patents being divisions of U.S. Pat. No. 4,258,479) describe a system for assembling tetrahedral blocks all having right-angled faces. For reasons explained later the Roane system, as more fully described below, is more limited, unwieldy, and less efficient than the present system. The Roane patents refer only in general terms to color coordination to aid in assembly and describe connecting the individual geometric elements to one another by means of magnets, arranged to attract and to repulse various faces of other tetrahedrons. Roane's disclosure relates to cubes, parallelepipeds (rectangular blocks) pyramids and tetrahedrons. She does not make reference to a regular rhombic dodecahedron. She does not disclose a sixteen-block system including eight each of only two tetrahedral shapes, wherein those two tetrahedral shapes each have at least one equilateral triangular face and those two tetrahedral shapes have a volume ratio of two-to-one, nor teach that sixteen blocks are capable of constructing a regular rhombic dodecahedron without using any additional blocks. She does not describe a sixteen-block system including eight each of only two tetrahedral shapes involving a total of only three different edge lengths and wherein both of the two tetrahedral shapes are center-of-gravity apexed.

Wahl U.S. Pat. No. 4,317,654 discloses a geometric block system which describes geometric structural relationships based upon a cube.

Zeischegg U.S. Pat. No. 3,659,360 discloses a construction set assembled from geometric parts having plane surfaces including at least one group of equal pyramids each having three, four or five equal side faces and at least one part in the form of a semi-regular or regular polyhedron having at least one plane of symmetry. Zeischegg's disclosure includes a one-quarter tetrahedron (FIG. 1 and Col. 3, lines 52–54; also Col. 4, lines 53–56) "octahedron halves 6" having "square pyramid bases" (Col. 4, lines 43–44) and "octahedron quarters 11" (Col. 4, lines 58) and "octahedron eights 3" (Col. 4, line 65). His disclosure also calls for two sizes of tetrahedrons: a tetrahedron 1 has a side length of $\sqrt{2}$, and a smaller tetrahedron 2 has a side length of one-half $\sqrt{2}$ (Col 3, lines 35–39). His disclosure calls for an icosahedron pyramid 4 (FIG. 26; Col. 3, lines 45–51). In addition to the octahedron half 6, there is Zeischegg's smaller octahedron half 7 (FIGS. 13 and 15; Col. 3, lines 58-59). Then, there is his pentahedron 8 (FIGS. 18 and 19; Col. 3, lines 61-64) and his rhomboid dodecahedron twelfth 9 (FIG. 8; Col. 3, lines 65-68). In addition Zeischegg shows a pentagonal pyramid 10 (FIGS. 23 and 24) and an octahedron quarter 11 (FIG. 3). Further Zeischegg shows an octagonal prism 12 (FIG. 9; Col. 4, lines 1-4) and an octagonal cap 13 (FIG. 9; Col. 4, lines 5-8). In addition he describes a hexagonal cap 14 (FIGS. 11 and 15; Col. 4, lines 8-13). Beyond all of those numerous, confusing random shapes of various faceted building blocks, Zeischegg calls for a hip roof 15 (FIGS. 17 and 18; Col. 4, lines 14-25) and a hexagon disc 16 (FIG. 5) which merely results from diagonally oriented parallel slices taken through a cube, as is seen by comparing his FIGS. 5 and 6.

In spite of these numerous and varied geometric shapes, Zeischegg does not disclose a sixteen-block system employing eight each of only two tetrahedral blocks for constructing a regular rhombic dodecahedron from only eight each of only two types of tetrahedral blocks, wherein at least one face of each such tetrahedral block is an equilateral triangle and two tetrahedral blocks have exactly a volume ratio of two-to-one, and those sixteen blocks are capable of constructing a regular rhombic dodecahedron without using any additional blocks and wherein those two tetrahedral blocks involve a total of only three different edge lengths and wherein both of said two tetrahedral blocks are derived from an originating regular tetrahedron so that both blocks are center-of-gravity apexed. In fact, when Zeischegg does disclose a rhombic dodecahedron in FIG. 7 he teaches that it is constructed from a four-sliced cube containing two hexagon discs 16 (FIG. 5) plus two octahedron eighths 3 (FIG. 5) sliced from a cube (FIG. 5) with six pentahedrons 8 placed upon each face of the underlying cube, thereby consisting of three different types of blocks with an overall total of ten blocks having five different edge lengths and wherein there are many different ratios.

SUMMARY

The invention described herein is an educational device consisting of certain basic geometrical forms and a method of using them in order to create more or less complex or different geometrical forms. The present invention more particularly relates to a sixteen-block system employing eight each of only two tetrahedral shapes for constructing a regular rhombic dodecahedron using only those sixteen blocks without any additional blocks and wherein the two tetrahedral shapes each have at least one equilateral triangular face and have a volume ratio of two-to-one and wherein the two tetrahedral shapes are both center-of-gravity apexed and involve a total of only three different edge lengths.

The block system embodying the present invention may be used by persons of different ages, from children old enough to manipulate the lightweight structures of the present invention to older children, or even adults, who are interested in learning about relationships between geometric forms. The method described herein for assembling or rearranging geometric structures includes a detailed color coordination system to facilitate assembly of the blocks. It also includes an improved means for attaching the lightweight, thin-walled geometrical forms contemplated by the present invention to provide stable structures, the elements of which may be easily disattached.

Critical to the simplicity and versatility of the present system is that the geometric structural forms employed thereby are center-of-gravity apexed. As is better illustrated in FIGS. 1A and 1B and as otherwise described below, this center-of-gravity apexing means that the (geometrical) apex of the basic tetrahedron building block in question is located at the center of gravity of the regular tetrahedron from which four identical center-of-gravity apexed tetrahedron building blocks are formed or at the center of gravity of the regular octahedron from which eight identical center-of-gravity apexed tetrahedron building blocks are formed. Additions to and divisions of a center-of-gravity apexed block are therefore symmetrical and regular. They are correspondingly more comprehensible and manageable. Center-of-gravity apexing has not been described in the prior related art insofar as I am aware. For example, Roane and Randolph (please see above) disclose systems which include a center-of-gravity apexed ⅛th octahedron but neither system recognized the significance of nor is based upon the center-of-gravity apexing which is central to the present sixteen-block system. Neither the Roane nor Randolph system includes the distinct center-of-gravity apexed ¼ tetrahedron, which is one of the only two basic structural elements of the present system. The Zeischegg disclosure also fails to describe center-of-gravity apexing. In such prior systems, because the blocks lack the symmetry of the present system, a limited variety of geometric structures may be made and those that are require more blocks in their construction and consequently are bulkier than the forms made by the present sixteen-block system.

The present invention contemplates the use of only two tetrahedral geometrical forms, based upon the principal of center-of-gravity apexing, to form a large variety of different and more complex structures. In the preferred embodiment of the present invention a geometrical block system is provided consisting of eight each of only two types of tetrahedrons, thereby making a total of only sixteen blocks. One of these two tetrahedrons has a volume exactly equal to twice the volume of the other tetrahedron. Moreover, both types of these tetrahedrons have at least one equilateral triangular face. Further, these two types of tetrahedrons involve a total of only three different edge lengths. In addition, this presently preferred embodiment of the present system enables a regular rhombic dodecahedron to be constructed using these sixteen blocks, without the addition of any other blocks.

The two types of tetrahedrons described above are center-of-gravity apexed. These two types of tetrahedrons are the two basic types of building blocks which characterize the preferred embodiment of the present invention, namely, a two-tetrahedron-types block system consisting only of sixteen blocks involving only eight of each of the two tetrahedron types.

These two types of basic-building-block tetrahedrons can each be sub-divided into two types of smaller parts, thereby providing four types of building-block geometrical forms, based upon the regular tetrahedron and the regular octahedron, as the building blocks of a four-block-type system described herein: the ¼th tetrahedron, the ⅛th octahedron, 1/6th of the ¼th tetrahedron (the 1/24th tetrahedron), and 1/12th of the ⅛th octahedron (the 1/96th octahedron).

The sixteen basic tetrahedron geometrical elements of the two-tetrahedron-types block system of the present invention are shown in FIGS. 1A and 1B. All of these sixteen tetrahedron elements in the present sixteen-block system are center-of-gravity apexed.

In FIG. 1A are shown eight center-of-gravity apexed tetrahedron basic building blocks formed from two regular tetrahedrons each having four equilateral triangular faces. Thus, each of these eight center-of-gravity apexed one-fourth tetrahedron basic building blocks has one equilateral triangular face defined by three edges each having a length designated herein as being length "a". The other three surfaces of these eight basic building blocks in FIG. 1A are isosceles triangular faces each having a longer edge of length "a" and two shorter edges each having a length designated herein as being length "b".

In FIG. 1B are shown eight center-of-gravity apexed tetrahedron basic building blocks formed from one regular octahedron having eight equilateral triangular faces whose edges are all of length "a". Consequently, each of these eight center-of-gravity apexed one-eighth octahedron basic building blocks has one equilateral triangular face defined by three edges of length "a". The other three surfaces of these eight basic building blocks in FIG. 1B are isosceles triangular faces each having a longer edge of length "a" and two shorter edges each having a length designated herein as being length "c".

Therefore, in summary, these two types of basic building blocks in FIGS. 1A and 1B include a total of only three edge lengths: "a", "b" and "c".

Moreover, each of the three isosceles triangular faces of the eight basic one-eighth octahedron basic building blocks in FIG. 1B are isosceles right triangles having an apex angle of 90° and two base angles of 45°.

Furthermore, in accordance with a concept involved with the present invention, each of the eight one-fourth tetrahedron basic building blocks in FIG. 1A is designated as having a volume of one cubic unit. Consequently, as will be explained later, each of the eight one-eighth octahedron basic building blocks in FIG. 1B has a volume of exactly two cubic units, thereby providing a volume ratio of two-to-one between the eight basic building blocks in FIG. 1B versus the eight basic building blocks in FIG. 1A As far as I am able to determine, the prior art does not disclose a ¼ regular tetrahedron building block having an equilateral triangular face and which is center-of-gravity apexed and is employed in a sixteen-block set consisting only of eight each of two types of tetrahedral center-of-gravity apexed blocks having a two-to-one ratio of volumes used for the construction of the regular rhombic dodecahedron. The counterpart octahedral structural element of the center-of-gravity apexed ¼ equilateral-triangular-faced tetrahedron is ⅛th of a regular octahedron having eight equilateral triangular faces and having exactly twice the volume the basic ¼ regular tetrahedron building block.

In combination with the center-of-gravity apexed ¼ regular tetrahedron, the center-of-gravity apexed ⅛th regular octahedron can be used to create a series of more complex geometrical forms which demonstrate a regular, whole-number progression of volumetric relationships. For example, in the present system if the volume of the center-of-gravity apexed ¼ regular tetrahedron of edge length "a" is taken as 1, that of the center-of-gravity apexed ⅛ regular octahedron also of edge length "a" is exactly 2, as will be shown later. Using four each of these two types of basic tetrahedral building blocks enables the construction of the simple cube having a volume of 12. In this system of the present invention the volume of the regular tetrahedron is 4, being constructed by using four of the one-unit-volume tetrahedral blocks, and the volume of the regular octahedron, constructed by using eight of the two-unit-volume tetrahedral blocks, is 16. The volume of the rhombic dodecahedron, constructed by using eight of the one-unit-volume tetrahedral blocks and eight of the two-unit-volume tetrahedral blocks, is 24.

Using thirty-two of the one-unit volume tetrahedral blocks and eight of the two-unit volume tetrahedral blocks, it is possible to construct a duo-tetrahedron having a volume of 48.

By using thirty-two of the one-unit-volume tetrahedral blocks and twenty-four of the two-unit-volume tetrahedral blocks it is possible to construct a cuboctahedron having a volume of 80.

Using four of the sixteen-block systems of the present invention it is possible to construct a complex cube having a volume of 96.

The basic center-of-gravity apexed ¼ regular tetrahedron and the basic center-of-gravity apexed ⅛th regular octahedron can be further subdivided to form two other principal structural elements made as subdivisions of the sixteen-building block system of the present invention, thereby providing the 1/24th tetrahedron and the 1/96th octahedron. These latter two symmetrically irreducible structural elements, with or in parallel with the center-of-gravity apexed ¼ regular tetrahedron and the center-of-gravity apexed ⅛th regular octahedron, may be used to create a series of more complex geometric forms which also demonstrate a whole-number progression of volumetric relationships: if the volume of the 1/24th tetrahedron is taken as 1, the volume of the 1/96th octahedron also becomes 1; then, the volume of the tetrahedron is 24, the volume of the isosceles dodecahedron is 48, of the simple cube, 72, of the octahedron, 96, of the rhombic dodecahedron, 144, of the duo-tetrahedron, 288, of the stellated rhombic dodecahedron, 288, of the cuboctahedron, 480, and of the complex cube, 576.

The ability of the present system, using two and only two center-of-gravity apexed tetrahedral structural elements having a two-to-one volume ratio to form most, if not all, radially symmetrical polyhedra in whole, rational, number increments, is a distinguishing characteristic of the present invention which is not shared by prior systems. For example, no combination of the blocks described by the Roane patents referred to above can form a distinct center-of-gravity apexed ¼ tetrahedron, its 1/24th component, or the 1/96th octahedron. The ability of the user of the present system to form a progression, demonstrating whole-number relationships, of blocks from merely two basic center-of-gravity apexed tetrahedral geometric forms of two-to-one volume ratio is an important advantage of the present system, in that it permits the user, often a young child, easily to see the structural relationships between the simplest and most complex geometric forms and easily and effectively to manipulate them, particularly when a youngster is using only the two center-of-gravity apexed basic tetrahedron building blocks having a two-to-one volume ratio.

Then, as briefly discussed above, these two basic center-of-gravity apexed tetrahedral geometric forms having a two-to-one ratio of volume, namely the ¼ regular tetrahedron (herein often called the "¼ T") and the ⅛ regular octahedron (herein often called the "⅛ O") each can be subdivided, as will be explained later, for providing the 1/24th tetrahedron (herein the "1/24 T") and the 1/96th octahedron (herein the "1/96 O"). The 1/24 T and the 1/96 O advantageously are center-of-gravity apexed. In addition to being center-of-gravity apexed, the 1/24 T and the 1/96 O are symmetrically irreducible structural elements, and thus they may be considered to be least common denominator ("LCD") structural elements, each having exactly the same volume.

The present system has the great advantage of requiring fewer elements to form the equivalent structures of other systems. The resulting geometric forms are consequently made up of fewer geometric elements and are smaller in volume and lighter in weight than their counterparts formed by other systems. As a result, geometric structures formed according to the present system are more easily manipulated and comprehended by users (often young) of the present systems. For example, whereas one rhombic dodecahedron formed according to the present system requires only 16 blocks of eight each of two tetrahedron shapes having a volume ratio of two-to-one, a prior system (Roane) requires six times as many blocks (96) to create a rhombic dodecahedron.

The ability of the user to comprehend the interaction between and to manipulate the geometric forms of the present invention is enhanced because two of the principal structural elements of the present system, the center-of-gravity apexed ¼ regular tetrahedron (¼ T) and the center-of-gravity apexed ⅛th regular octahedron (⅛ O), share a common edge length "a" (the blocks of the present system have but three different edge lengths "a", "b" and "c") and a common equilateral triangular block face also of edge length "a". It will become surprisingly and pleasingly clear upon inspection to the user of the present sixteen-block system that like edge length is to be matched with like edge length. The same pleasing surprise is true for matching together the common equilateral triangular block faces.

It is therefore an important characteristic of the present system that, although it is more versatile and can make a broader variety of regular and semi-regular geometric forms than previous systems, the inherent symmetry and simplicity of its structural elements makes it easier to comprehend and to use than prior systems. For example, whereas one of the prior systems (Roane) has a ¼ tetrahedron (not center-of-gravity apexed) with four different edge lengths, the center-of-gravity apexed ¼ regular tetrahedron (¼ T) of the present system has only two edge lengths "a" and "b". Again, the center-of-gravity apexed ¼ regular tetrahedron (¼ T) of the present system of one-unit-volume has an equilateral triangular face exactly matchable with a same size equilateral face of the two-to-one volume, center-of-gravity apexed ⅛ regular octahedron (1/8 O). Again, and related to the lack of symmetry of their geometric elements, prior systems, unlike the present system, have a number of non-identical forms, leading to non-functional differentiation of forms and structural complexity.

As will be better described below, the present system also permits certain manipulations of structural forms, as well as the creation of certain geometric forms, not permitted by prior systems. For example, the complex cube of the present invention can be transformed into four (16 block) rhombic dodecahedra or four complex (144 block) LCD rhombic dodecahedra. One of these complex rhombic dodecahedra may have a tetrahedron core, the second, an octahedron core, the third, a rhombic dodecahedron inside a cuboctahedron, and a fourth, one of the above-mentioned three. Free conversion to all of these forms, and similar other such conversions, is a characteristic of the present invention and is very desirable for a comprehensive and effective educational system for creating geometrical forms.

BRIEF DESCRIPTION OF THE DRAWINGS

The invention, together with further objects, features, advantages and aspects thereof, will be more clearly understood from the following detailed description considered in conjunction with the accompanying drawings many of which are not drawn to scale with the emphasis instead being placed upon clearly illustrating the principles of the invention. Like reference numerals indicate like elements, like components or like geometric forms throughout the different views.

The accompanying drawings, which are incorporated in and constitute a part of the specification, illustrate the presently preferred systems and method of the invention and, together with the general description set forth above and the detailed description of the preferred embodiments set forth below, serve to explain the principles of the invention. In these drawings:

FIG. 1A shows two regular, equilateral-triangular-faced, tetrahedrons each having edge lengths "a" being divided to form four each center-of-gravity apexed tetrahedrons, thereby providing eight identical, tetrahedron building blocks of the present invention, with each of said eight tetrahedron building blocks being designated herein as having a volume of one cubic unit.

FIG. 1B shows one regular, equilateral-triangular-faced octahedron having edge lengths "a" being divided to form eight center-of-gravity apexed tetrahedrons, thereby providing eight identical tetrahedron building blocks of the present invention, with each of said eight tetrahedron building blocks in this FIG. 1B having a volume of two cubic units. The eight tetrahedron building blocks of FIG. 1A plus the eight tetrahedron building blocks of FIG. 1B provide a preferred sixteen-block system of the present invention.

FIG. 1C shows a regular, equilateral-triangular-faced octahedron from a different viewpoint (and on a smaller size) than the octahedron shown in the center of FIG. 1B.

A FIG. 1A tetrahedron building block is a center-of-gravity apexed one-quarter regular tetrahedron of edge length "a". For convenience a FIG. 1A tetrahedron building block may from time-to-time be called a "¼ T".

Figure 2A:
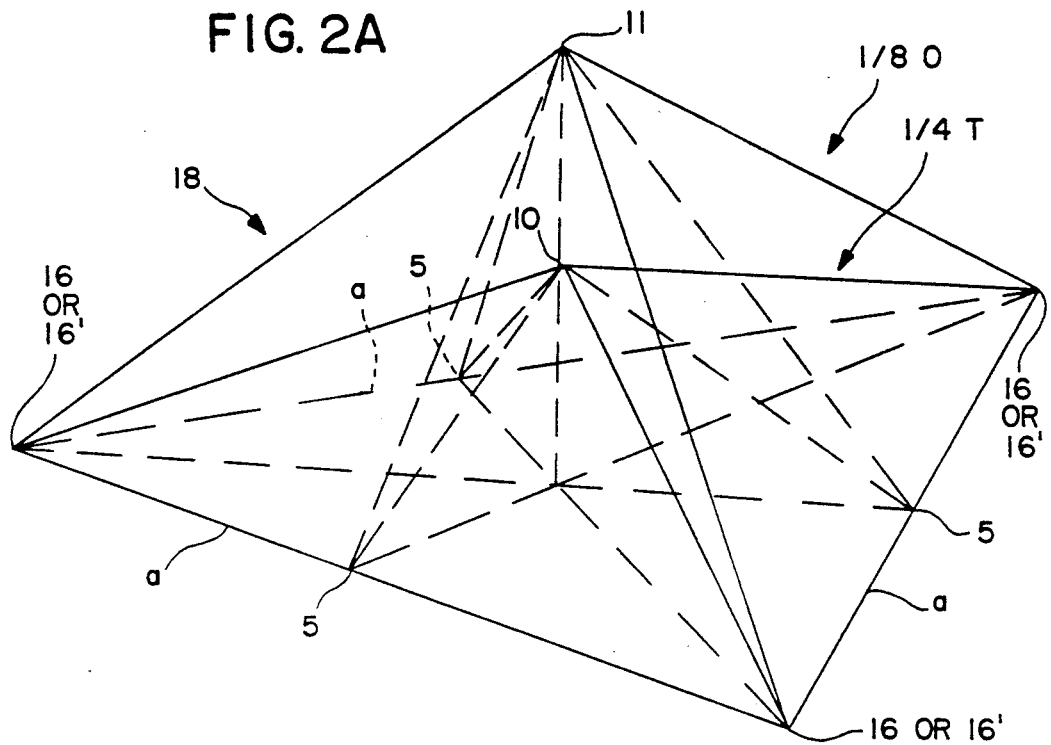
FIGS. 2A and 2B show the relationships between a FIG. 1A tetrahedron building block and a FIG. 2A tetrahedron building block.

A FIG. 2A tetrahedron building block is a center-of-gravity apexed one-eighth regular octahedron of edge length "a". For convenience a FIG. 1B tetrahedron building block may from time to time by called a "⅛ O".

Figure 2B:
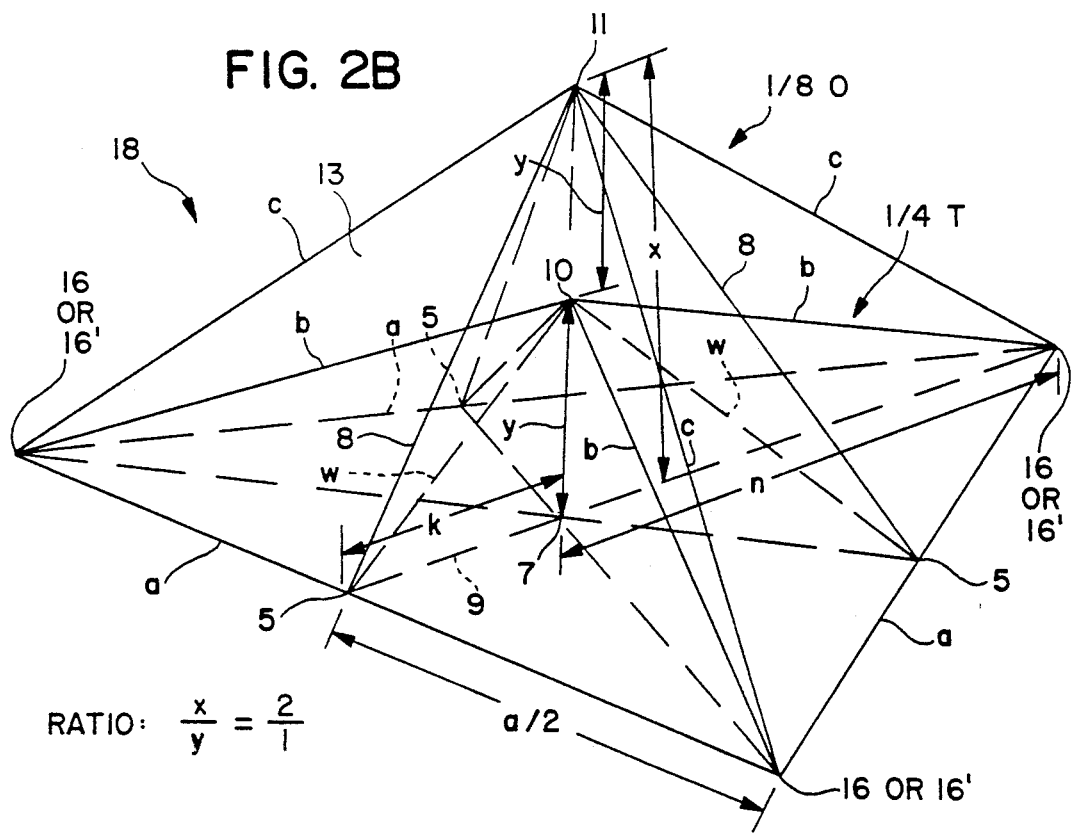
Figure 3:
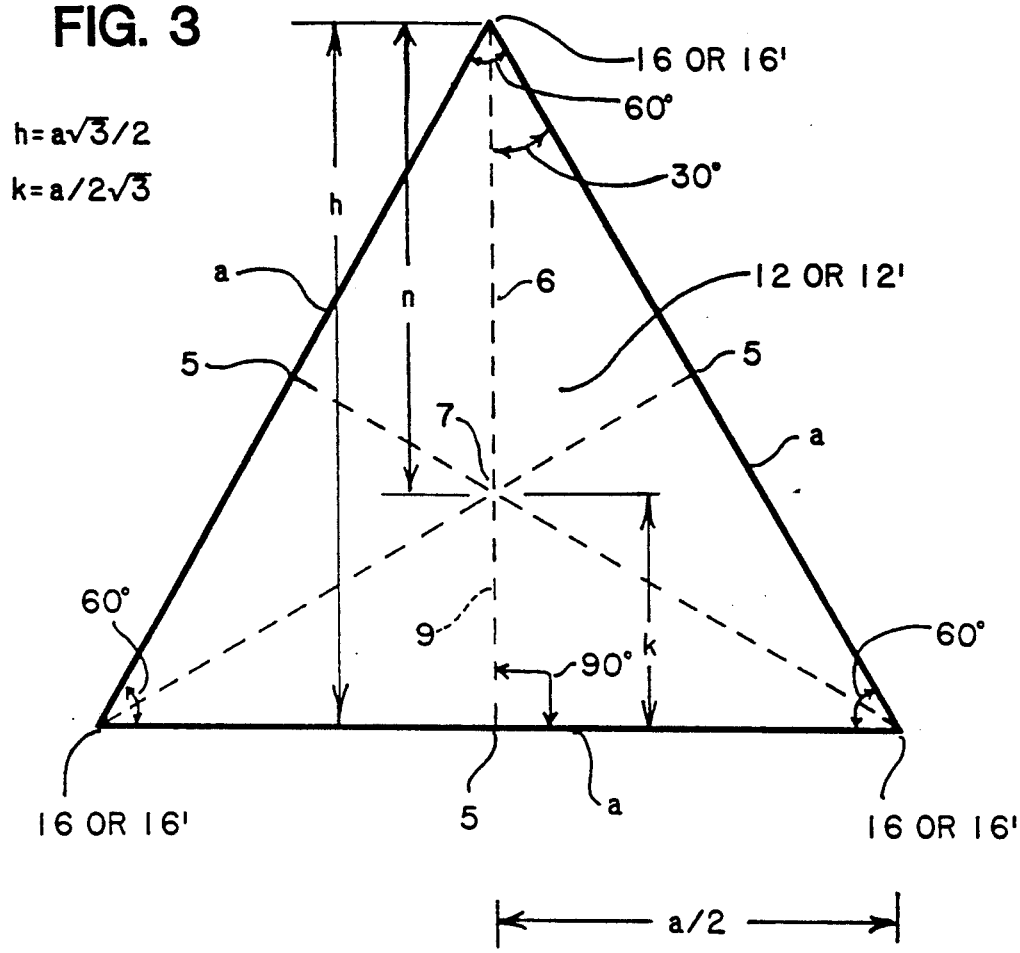

FIG. 3 is a plan view of an equilateral triangular face of edge length "a" which forms the bottom face (base face) of the tetrahedrons shown in FIGS. 2A and 2B.

Figure 4:
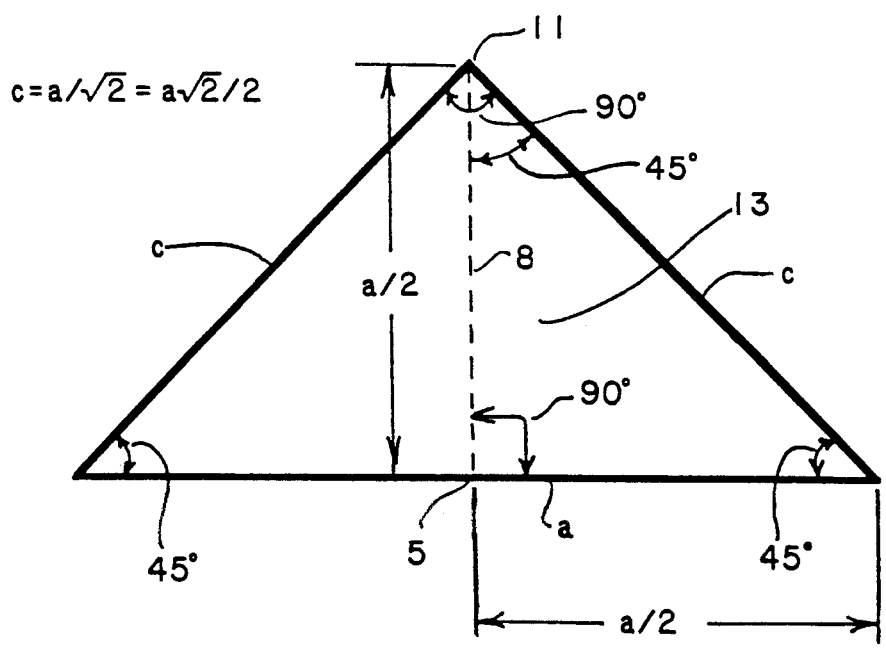

FIG. 4 is a plan view of an isosceles triangular face of a ⅛ O. The isosceles triangular face has a longer edge (longer "side" of a triangle) of length "a" and has two shorter edges (sides) of length "c". Moreover the apex angle of this isosceles triangle is 90°, and each of its two base angles is 45°.

Figure 5:
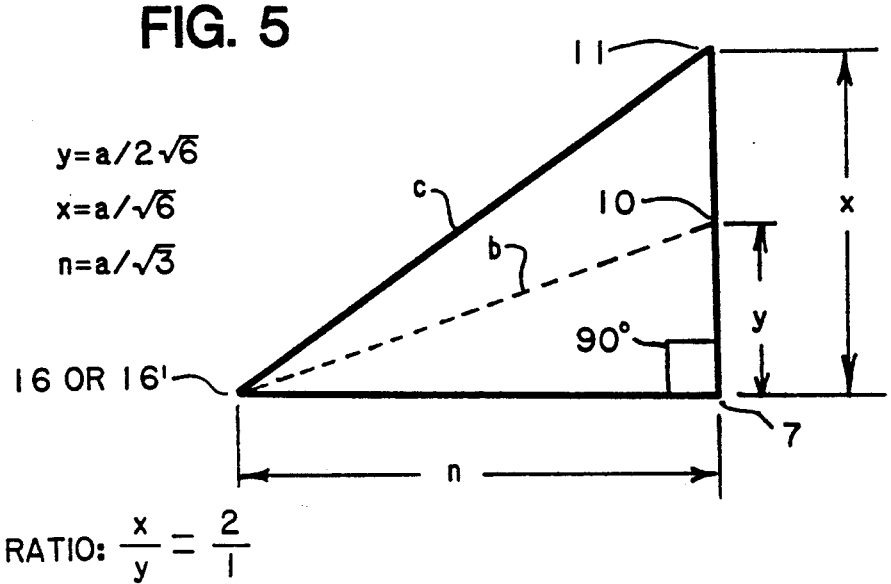

FIG. 5 is a plan view of an interior triangle formed from FIG. 2B by a plane defined by the two center-of-gravity apexes 10 and 11 and a base vertex 16 or 16'.

Figure 6:
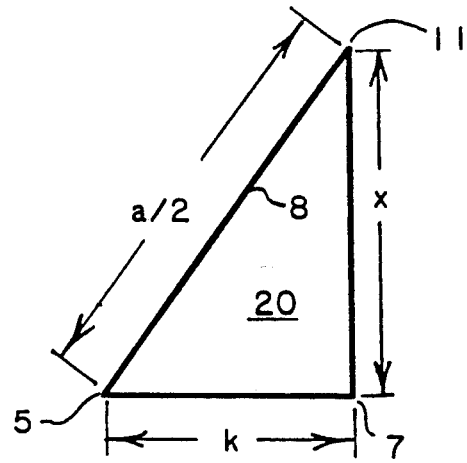

FIG. 6 is a plan view of an interior triangle formed from FIG. 2B by a plane defined by the two center-of-gravity apexes 10 and 11 and a mid-point of a base edge of length "a".

Figure 7:
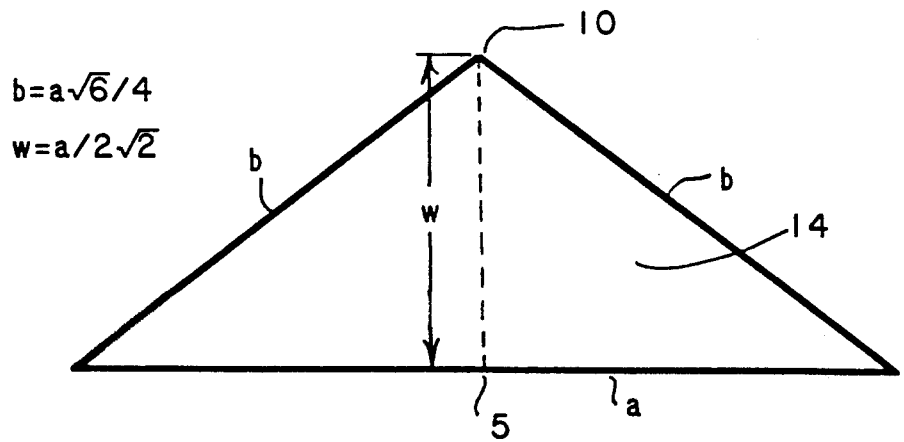

FIG. 7 is a plan view of an isosceles triangular face of a ¼ T. This isosceles triangular face has a longer edge (side) of length "a" and has two shorter edges (sides) of length "b". This length "b" is equal to a $\sqrt{6}/4$, as will be shown later.

FIG. 8 is a perspective view, drawn on a smaller size than FIGS. 1A and 1B, showing a regular rhombic dodecahedron formed by the sixteen tetrahedron blocks of the present invention, namely formed by eight ¼ T blocks and eight ⅛ O blocks.

FIG. 9 is a perspective view, drawn on a larger size, showing the regular rhombic dodecahedron which is seen at the center of FIG. 8.

Figure 10:
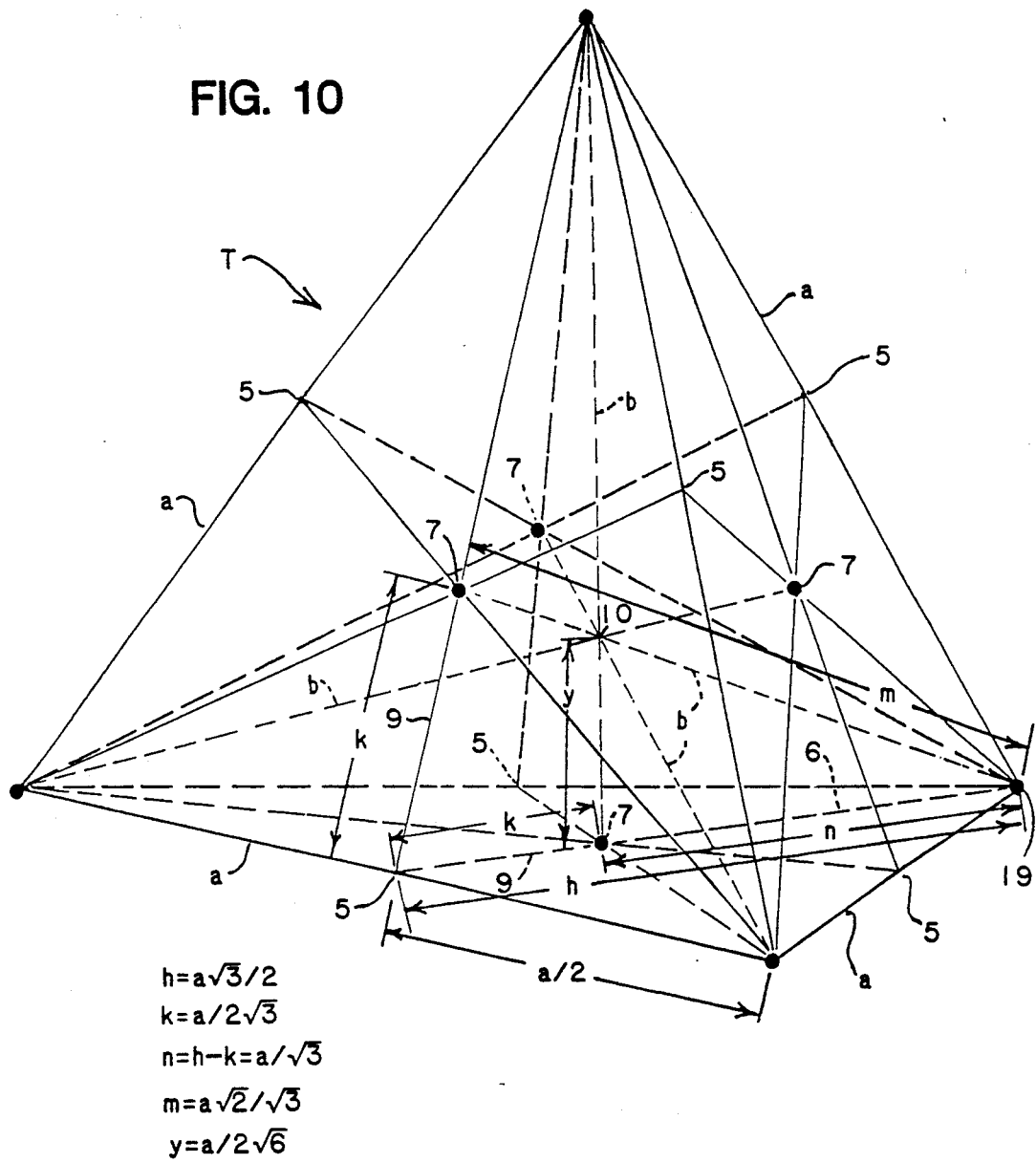

FIG. 10 is an enlarged view of a regular tetrahedron with six planes intersecting at the center-of-gravity point 10 and defining various internal triangles for purposes of explanation.

FIG. 11 shows two cubes which can be constructed with the sixteen-block system of the present invention comprising eight ¼ T blocks and eight ⅛ O blocks.

FIG. 12 shows two regular tetrahedrons and a regular octahedron, all three of which are constructible using only the sixteen blocks consisting of eight ¼ T blocks and eight ⅛ O blocks.

Figure 13:
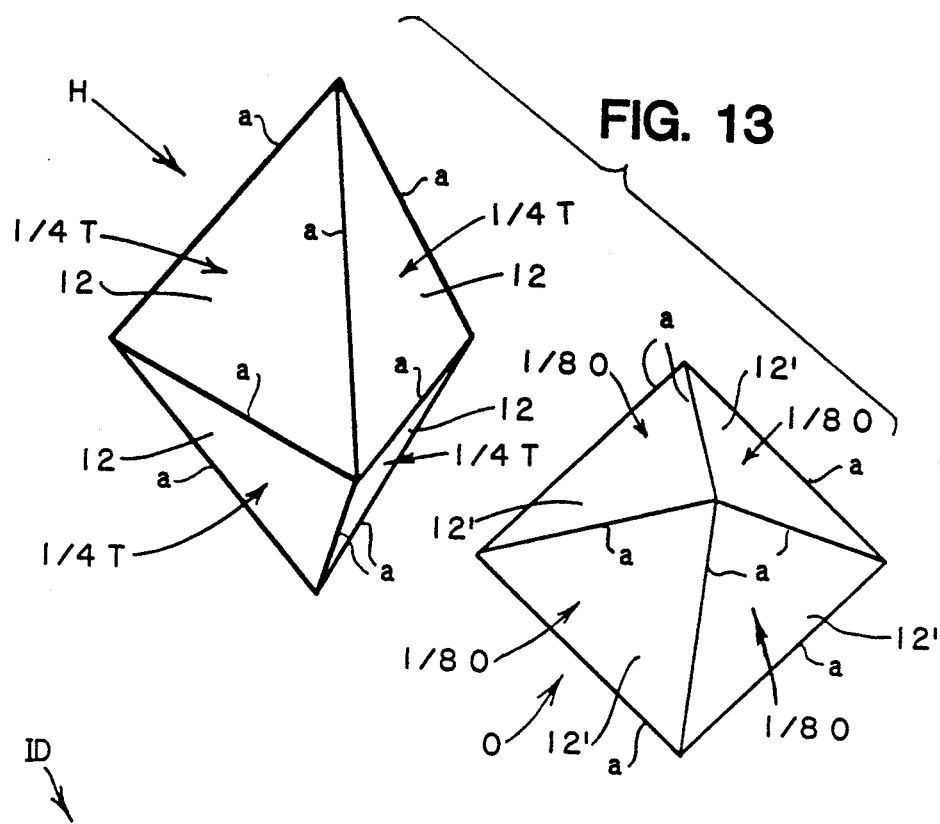

FIG. 13 illustrates a regular hexahedron and a regular octahedron both of which can be formed using only the sixteen blocks: eight ¼ T blocks and eight ⅛ O blocks.

Figure 14:
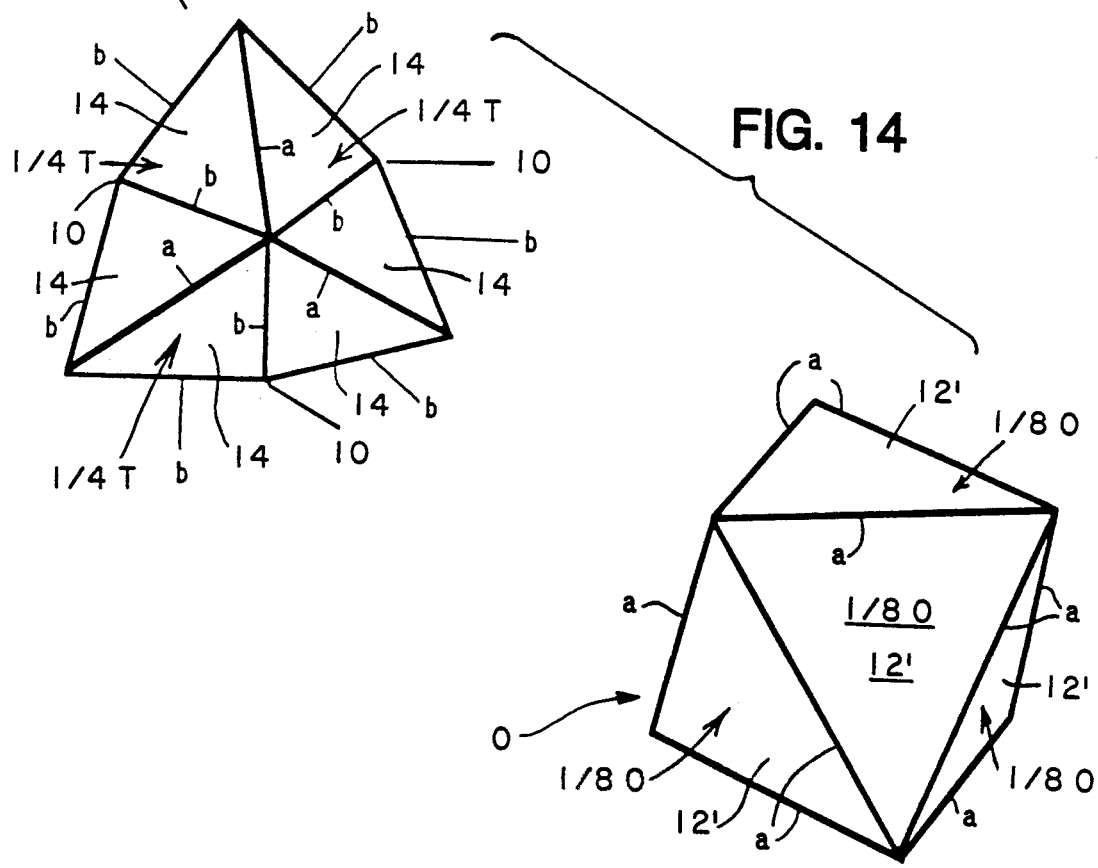

FIG. 14 shows an isosceles dodecahedron and a regular octahedron. Both are constructible using only the above-described sixteen blocks.

Figure 15:
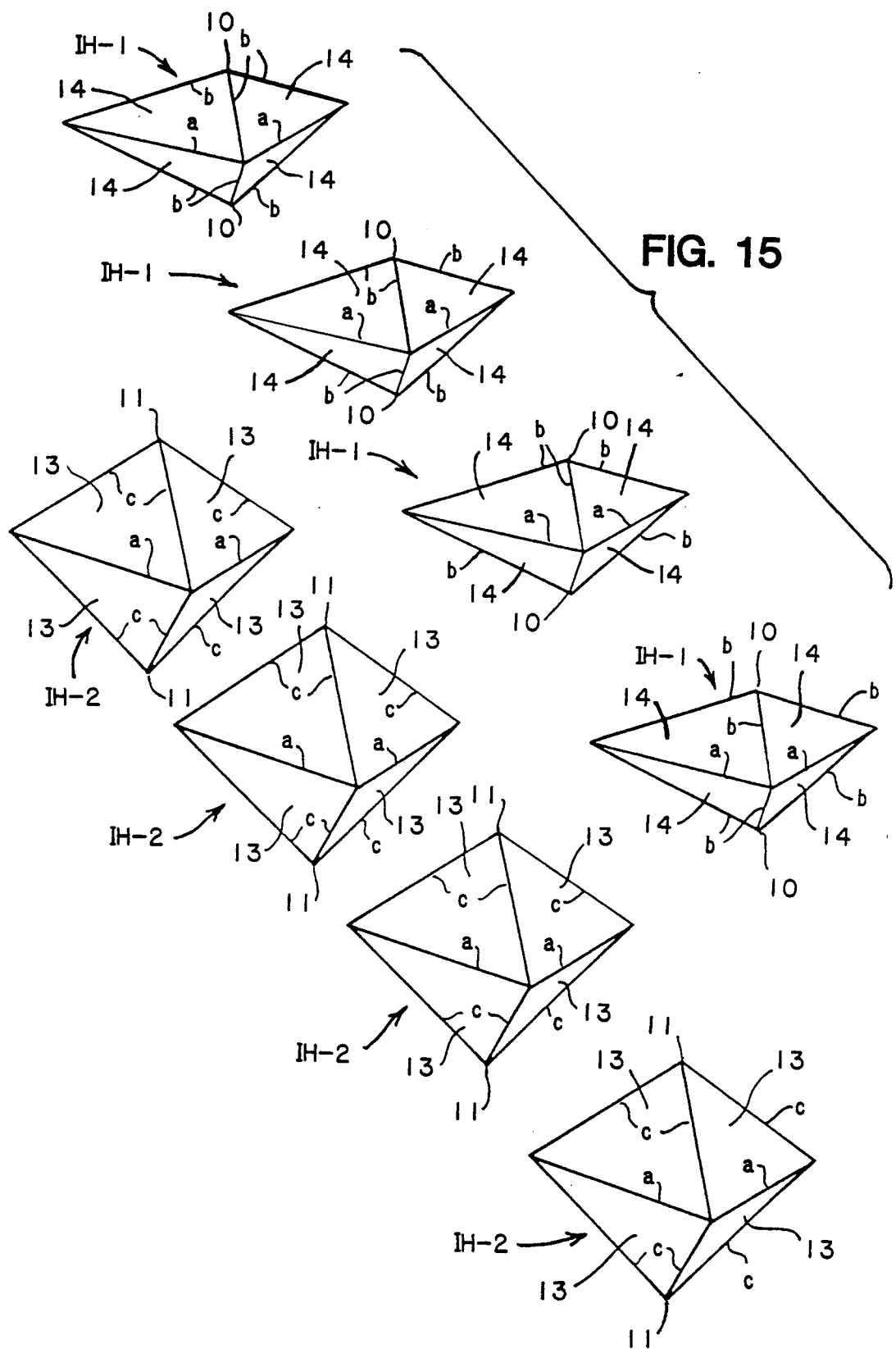

FIG. 15 shows four each of two different shapes of isosceles hexahedrons, namely a total of eight isosceles hexahedrons which can be constructed with only those sixteen blocks.

Figure 16:
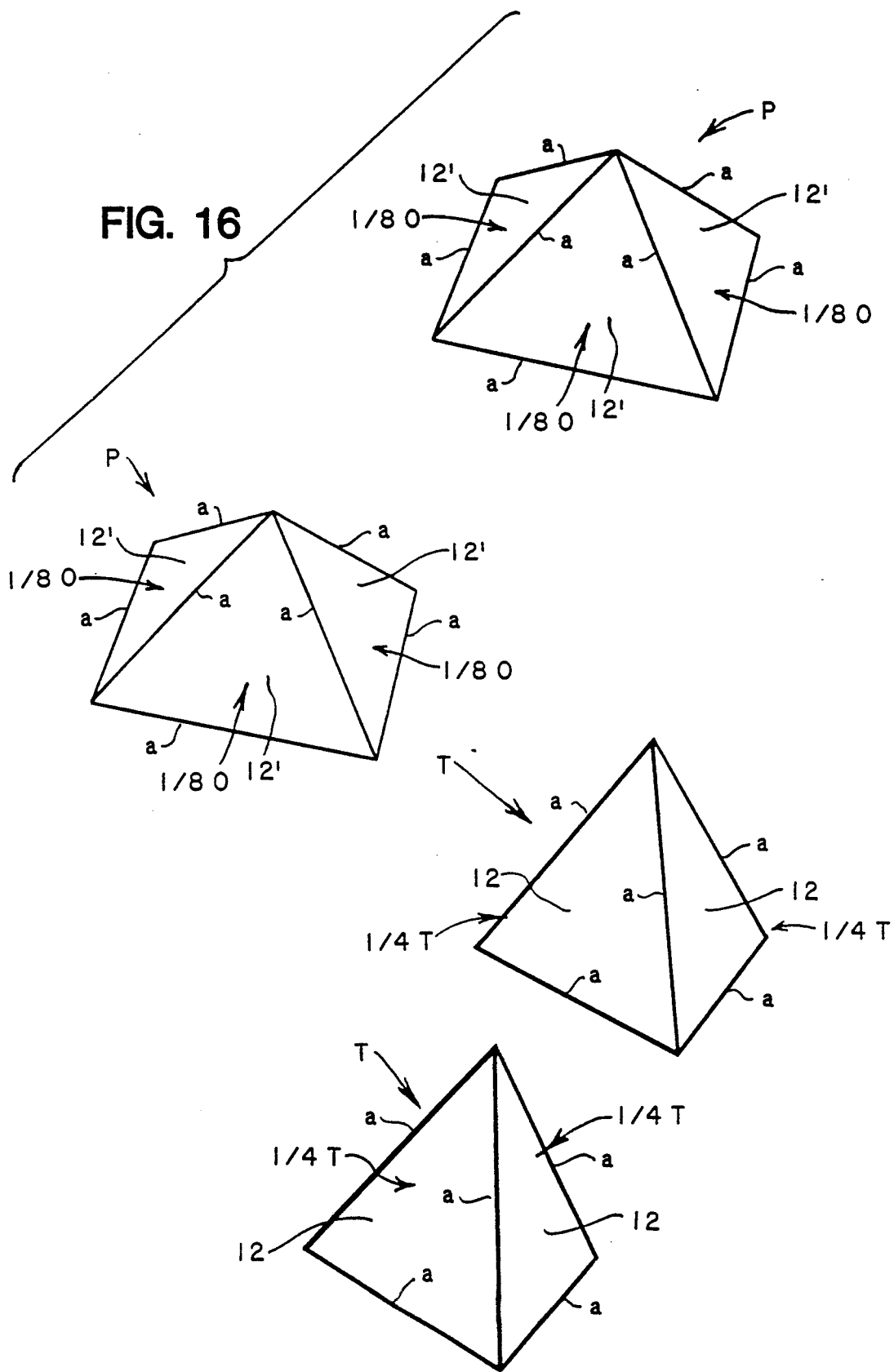

FIG. 16 illustrates two square-base pyramids each having four equilateral triangular faces and two regular tetrahedrons, all of which can be constructed using only those sixteen blocks.

Beyond FIG. 16, it is understood that the user has available four sets of the basic sixteen blocks.

Figure 17:
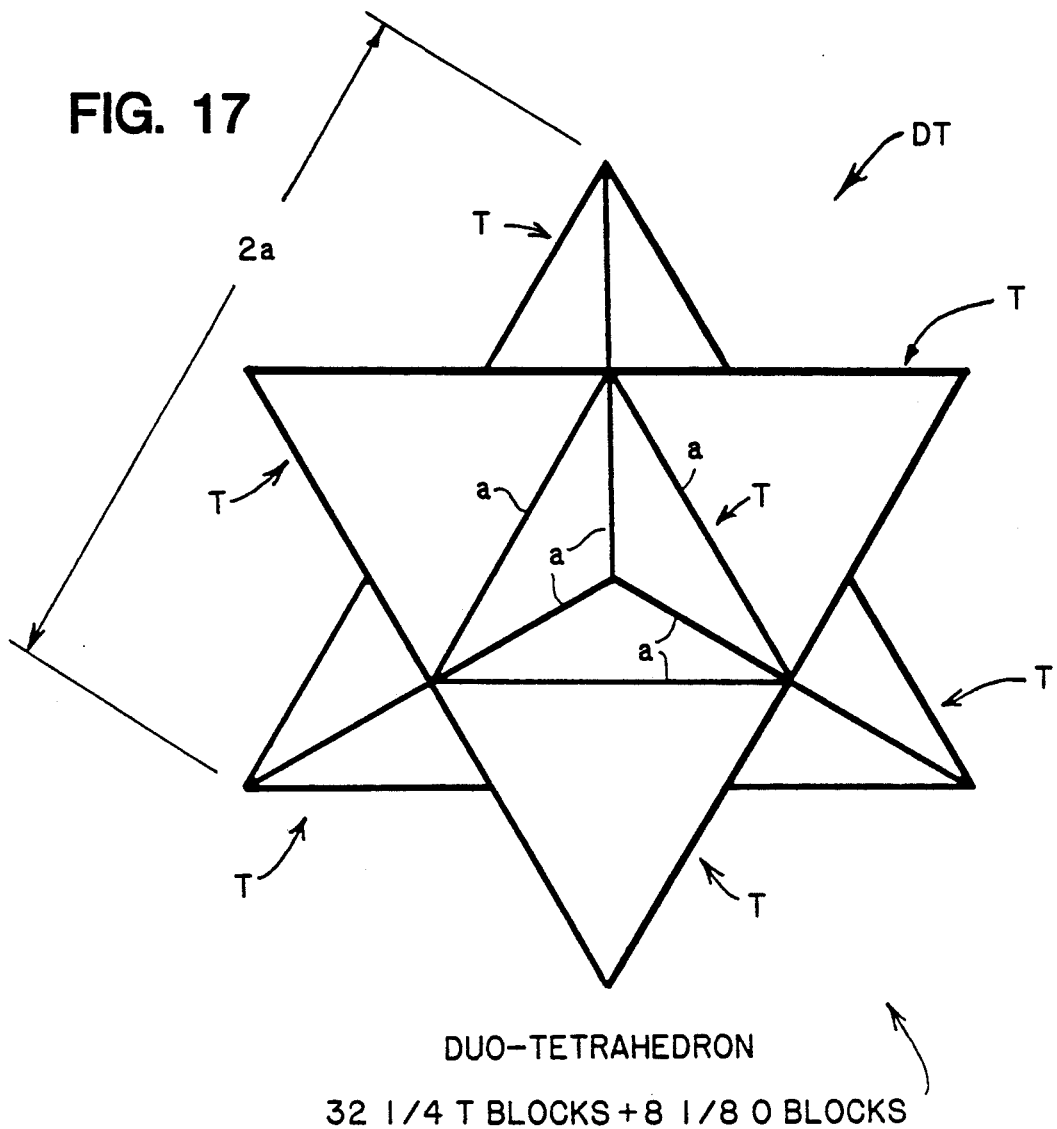
Figure 17A:
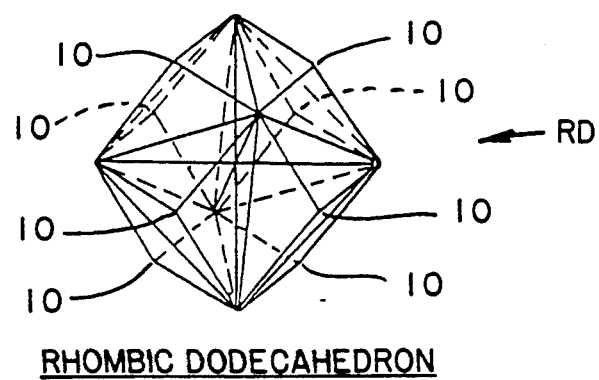

FIG. 17 pictures a duo-tetrahedron constructed with thirty-two ¼ T blocks and eight ⅛ O blocks FIG. 17A illustrates a regular rhombic dodecahedron underlying (contained within) the duo-tetrahedron of FIG. 17. Moreover, a regular octahedron underlies (is contained within) this regular rhombic dodecahedron.

Figure 18:
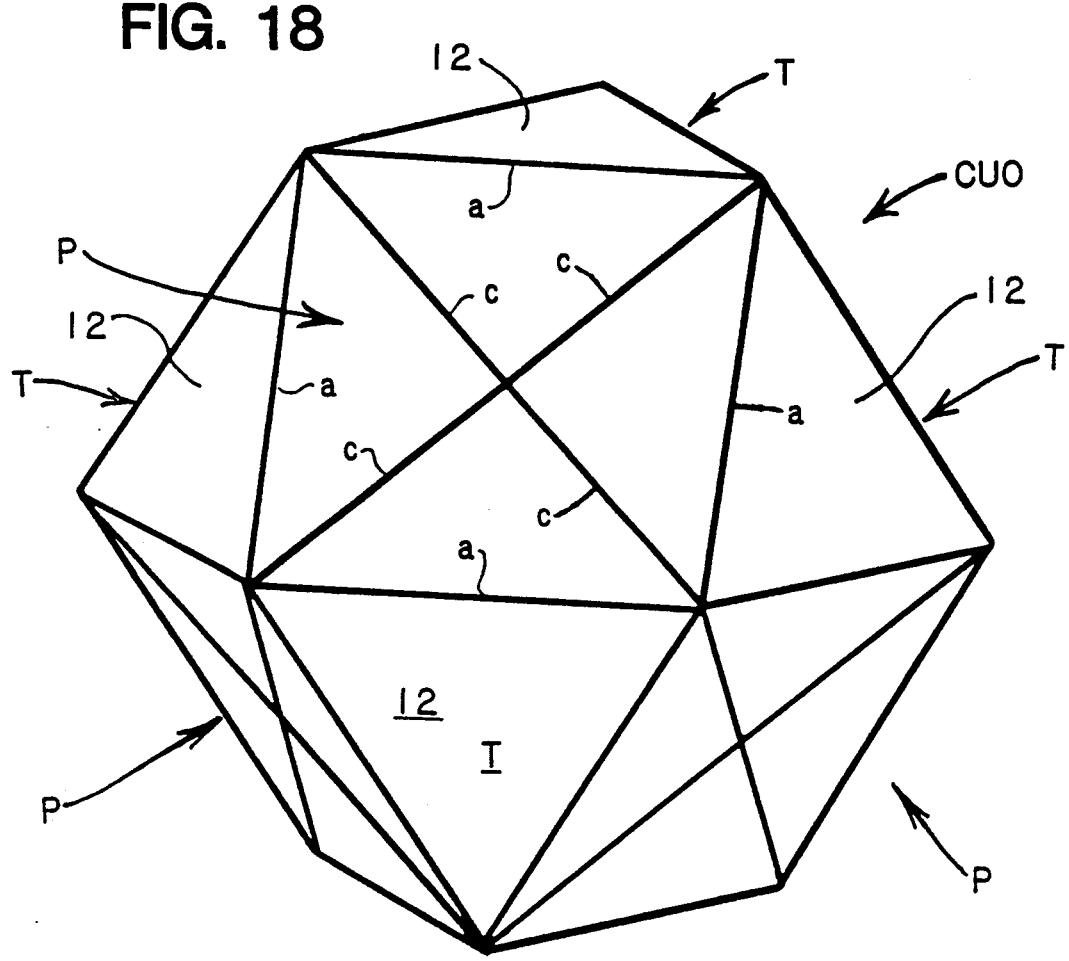

FIG. 18 shows a cuboctahedron assembled from thirty-two ¼ T blocks plus twenty-four ⅛ O blocks.

Figure 19:
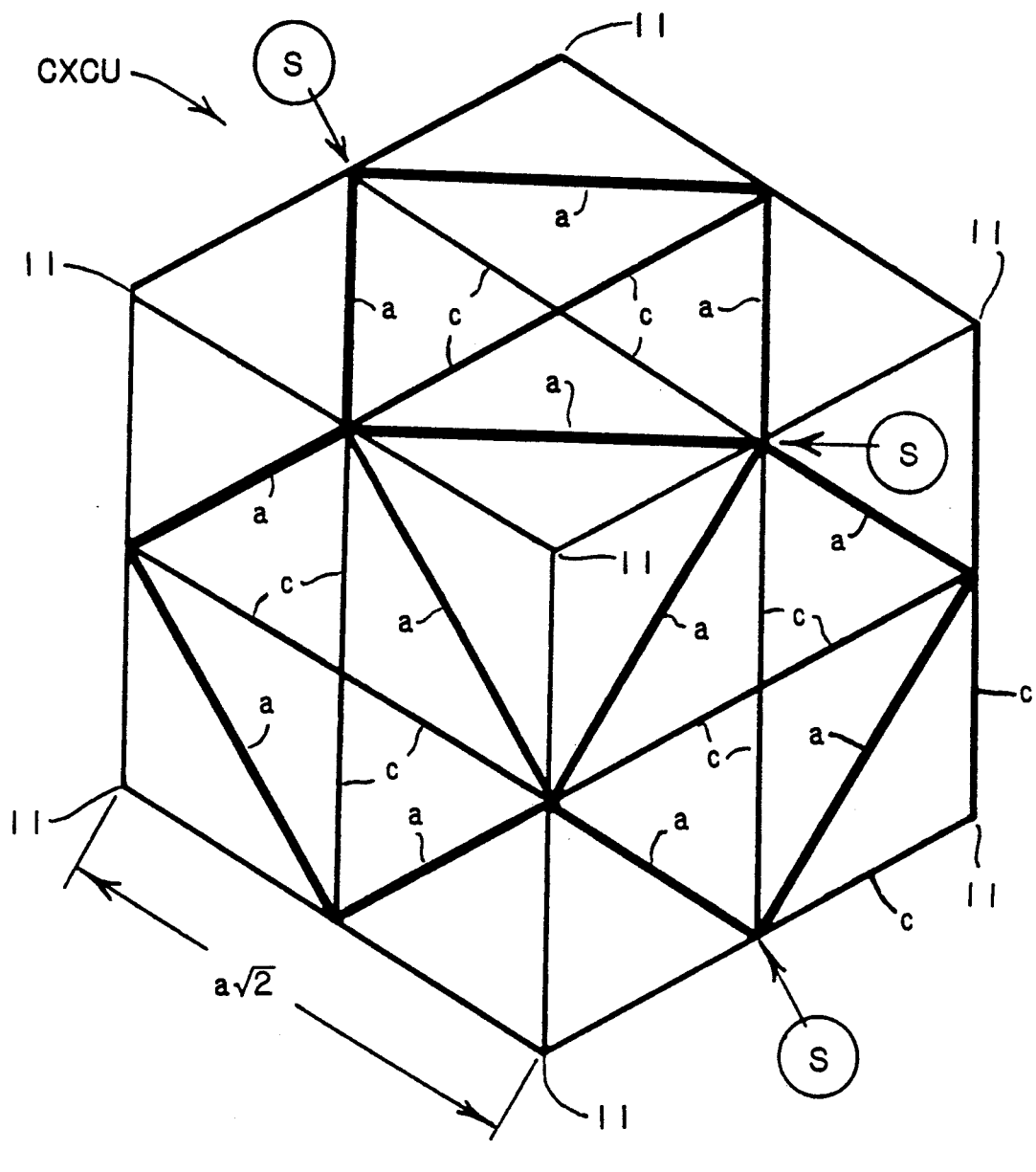

FIG. 19 shows a complex cube constructed from thirty-two ¼ T blocks plus thirty-two ⅛ O blocks. The complex cube of FIG. 19 is in its cuboctahedron state (or cuboctahedron mode).

Figure 20:
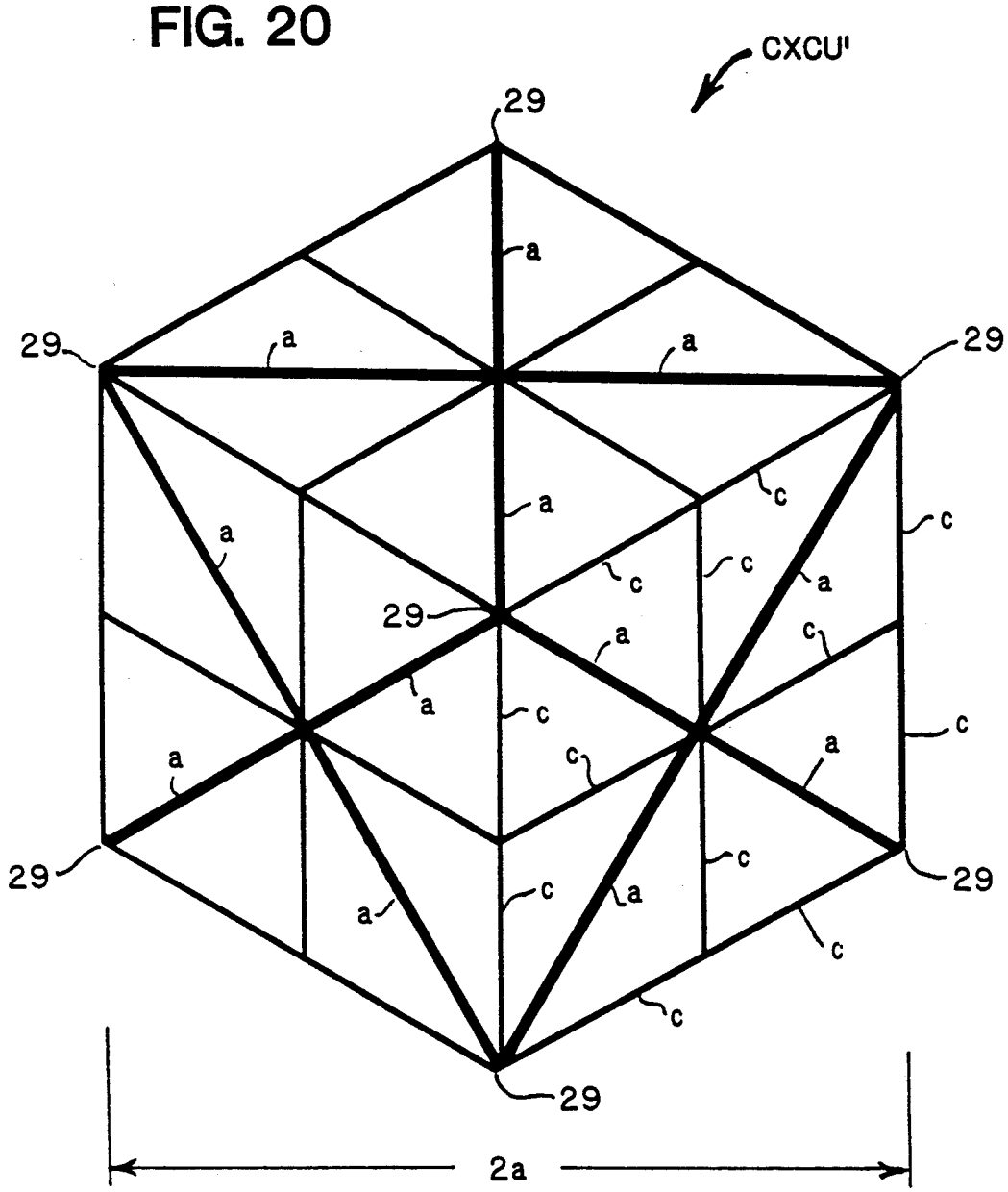

FIG. 20 pictures another complex cube consisting of the same number of blocks as in FIG. 19, but in FIG. 20 the complex cube is in its duo-tetrahedron state as explained later.

Figure 21:
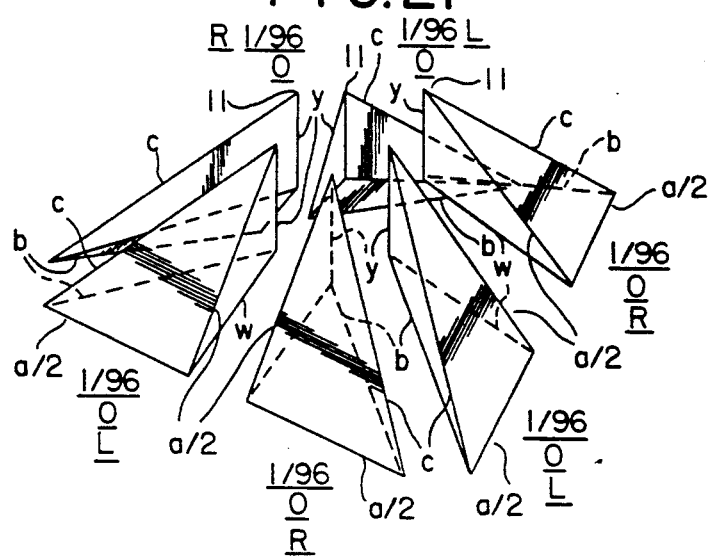
Figure 22:
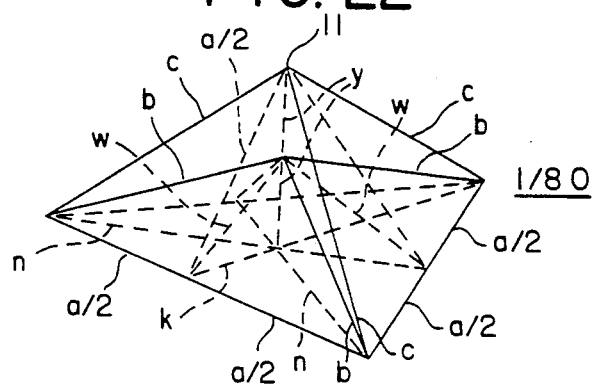
Figure 23:
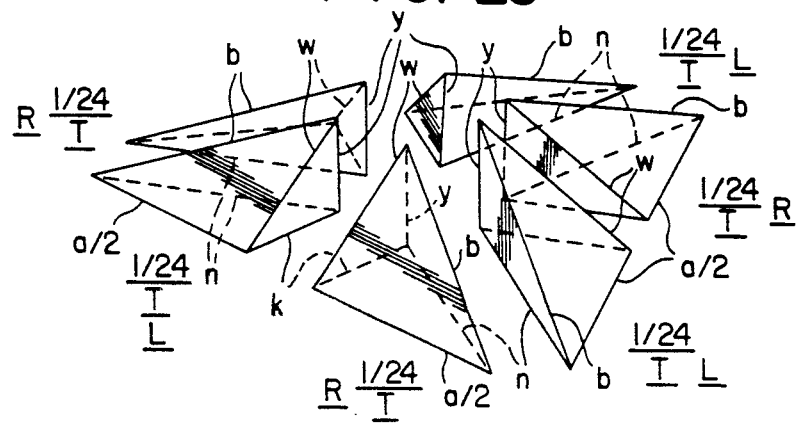

FIGS. 21, 22 and 23 show the manner in which 1/24 T blocks and 1/96 O blocks are cut out of a ⅛ O block superimposed upon a ¼ T block, such that the 1/24 T block and the 1/96 block are least common denominator ("LCD") blocks in a geometric block building system. A reason for calling them LCD blocks is that neither the 1/24 T block nor the 1/96 O block is capable of further symmetrical subdivision. Both the 1/24 T block and the 1/96 O block are center-of-gravity apexed; they have a one-to-one volume ratio; and they also have four corresponding equal edge lengths.

Beyond FIG. 23 it is assumed that the user has as many 1/24 T blocks and 1/96 O blocks as needed to construct various complex geometric structures as described in detail later.

Figure 24:
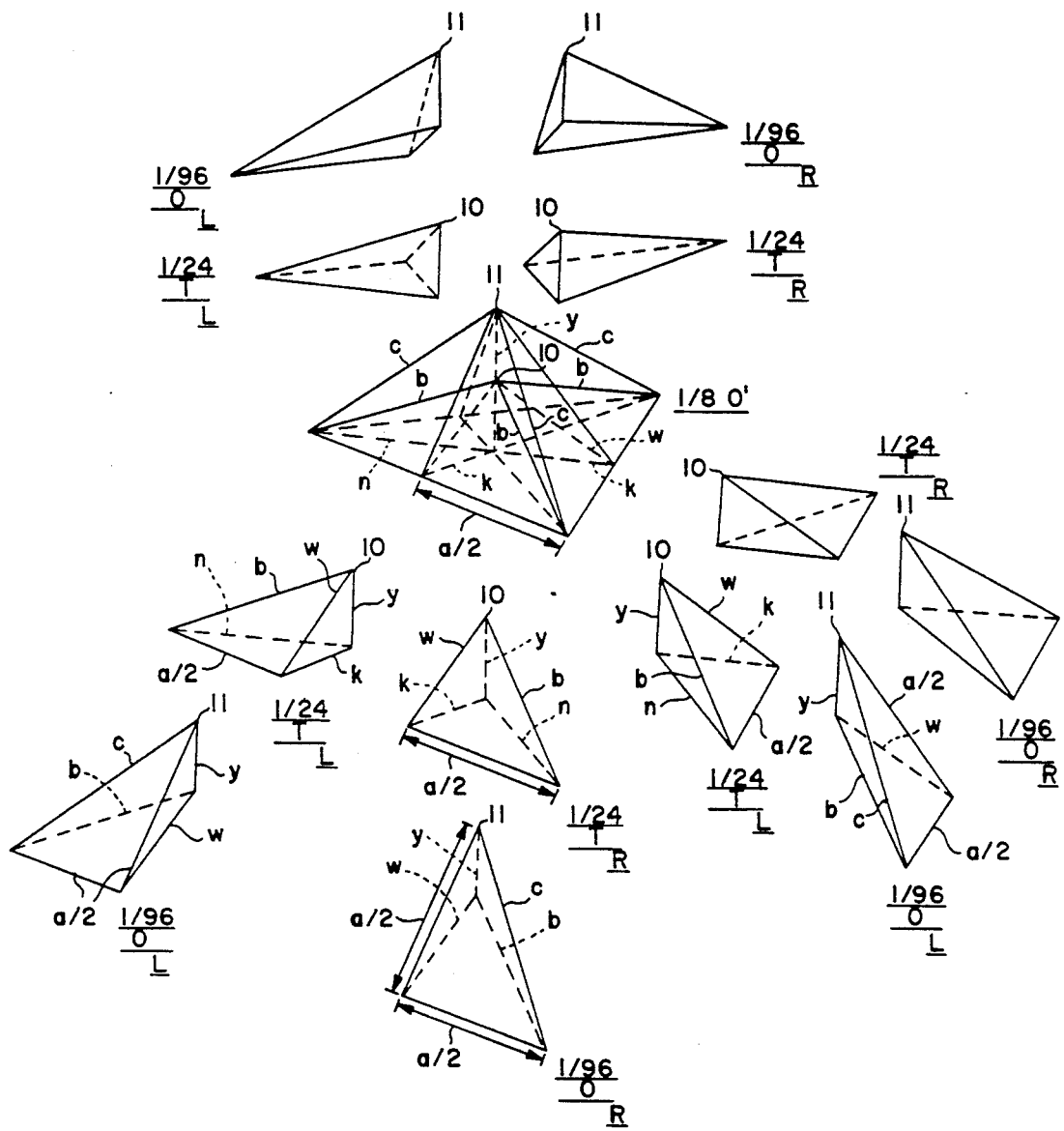

FIG. 24 shows an LCD ⅛ octahedron ⅛ O' and also shows the twelve LCD blocks used to construct this ⅛ octahedron, namely, six 1/24 T blocks (three lefts "L" and three rights "R") plus six 1/96 O blocks (three lefts "L" and three rights "R").

FIG. 25 illustrates an LCD cube.

FIG. 26 illustrates the LCD cube of FIG. 25 in partially exploded condition.

FIG. 27 pictures an LCD isosceles dodecahedron.

Figure 28:
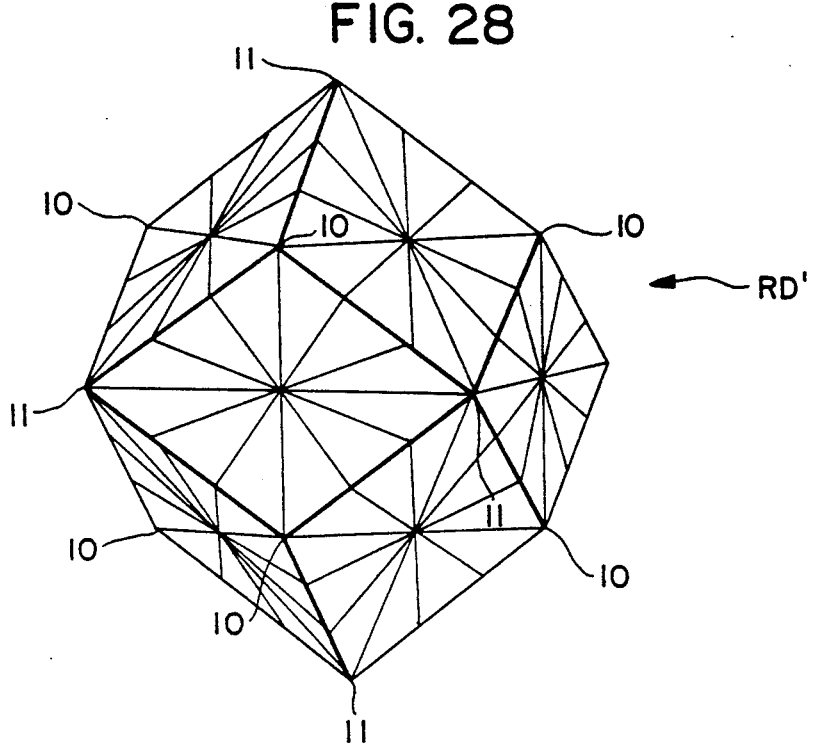

FIG. 28 shows an LCD rhombic dodecahedron constructed from twelve irregular pyramids all of whose apexes are pointing inwardly to the center of this LCD rhombic dodecahedron.

Figure 28A:
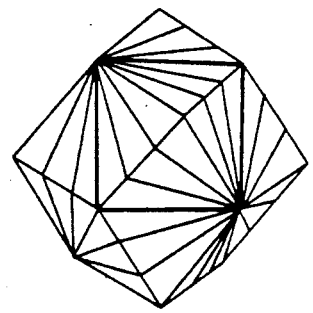
Figure 34A:
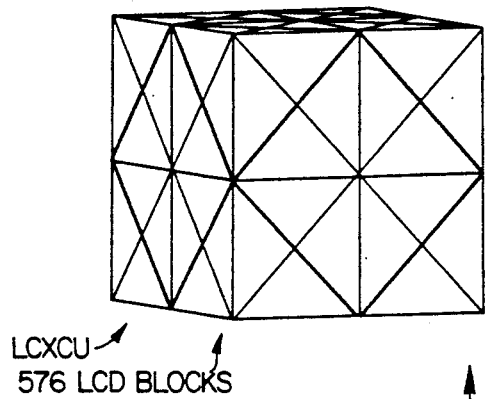
Figure 35A:
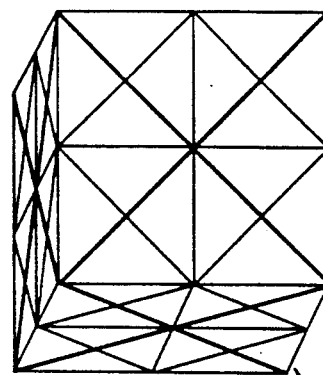
Figure 32A:
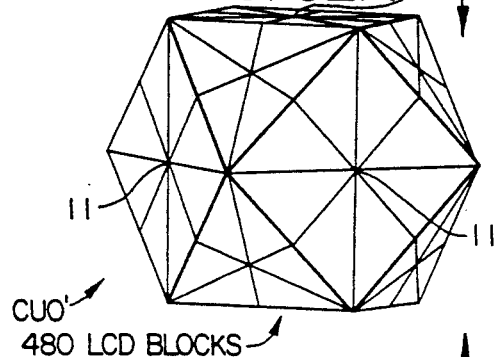
Figure 33A:
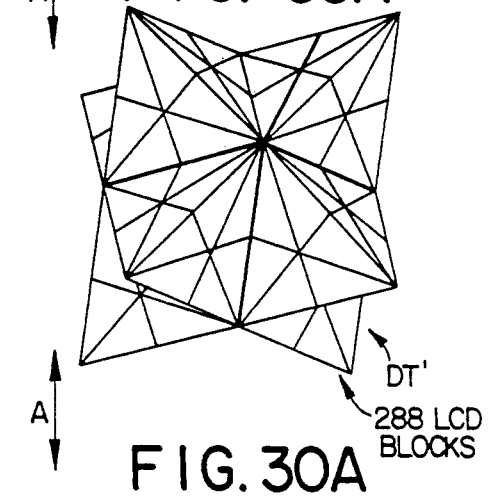
Figure 36A:
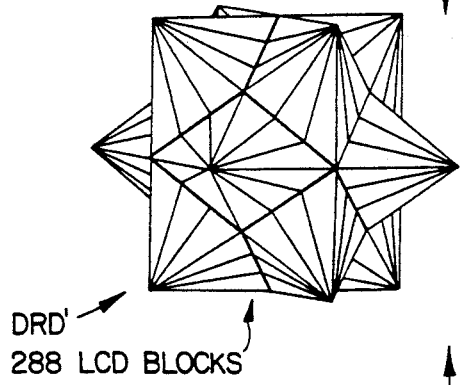

FIG. 28A illustrates an LCD rhombic dodecahedron, in which a regular tetrahedron forms the inner core of this rhombic dodecahedron.

Figure 29:
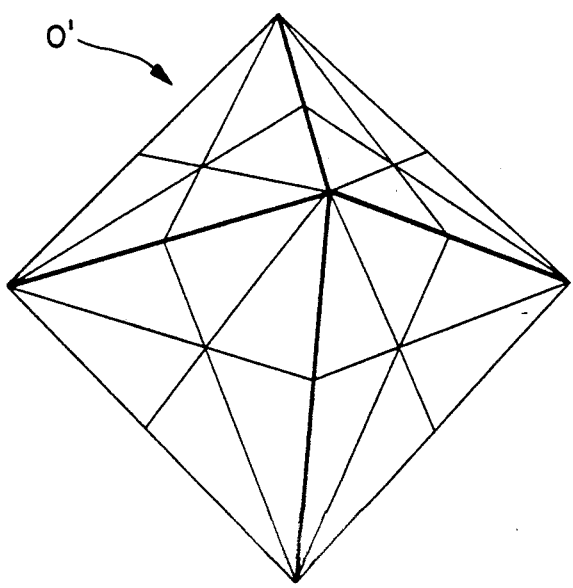

FIG. 29 illustrates an LCD regular octahedron.

Figure 30A:
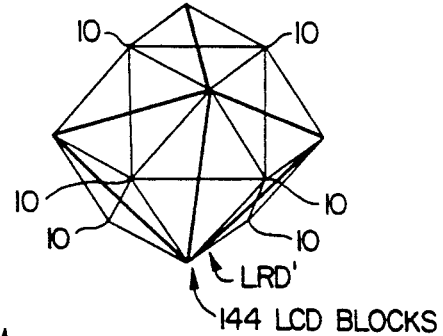
Figure 28A:
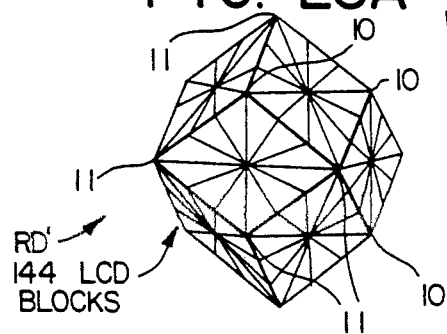
Figure 29A:
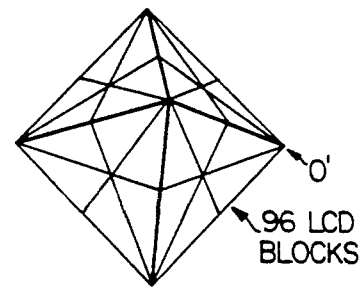

FIG. 30 pictures, another rhombic dodecahedron having an interior LCD octahedron core.

FIG. 31 pictures a partially exploded LCD rhombic dodecahedron of the type having an interior LCD octahedron core.

Figure 32:
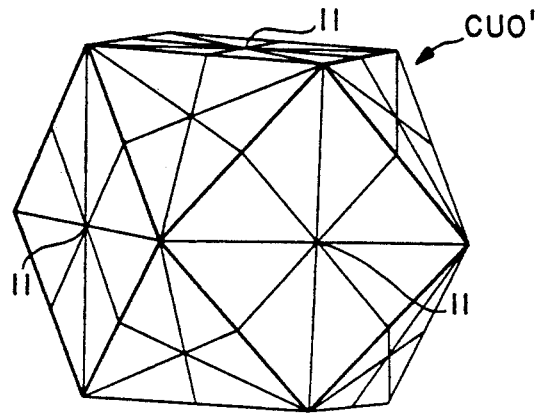

FIG. 32 shows an LCD cuboctahedron.

Figure 33:
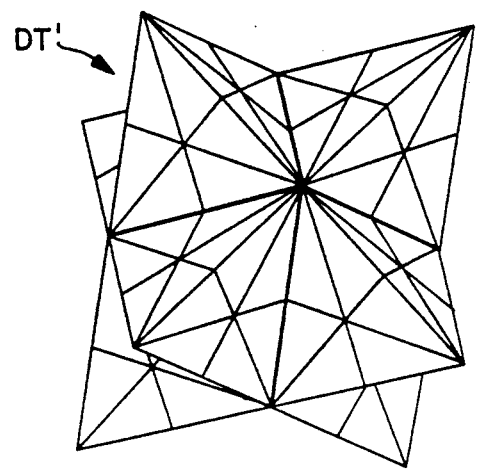

FIG. 33 illustrates an LCD duo-tetrahedron.

Figure 34:
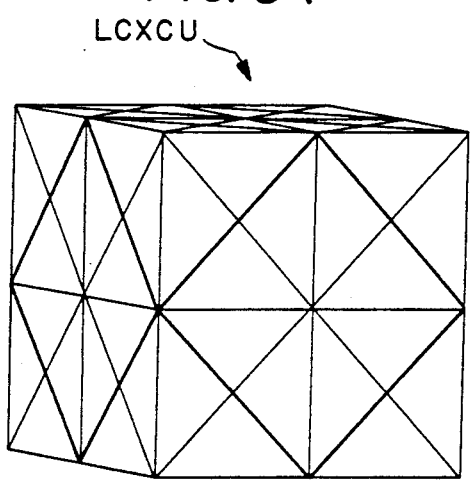

FIG. 34 pictures an LCD complex cube in the cuboctahedron state or mode.

Figure 35:
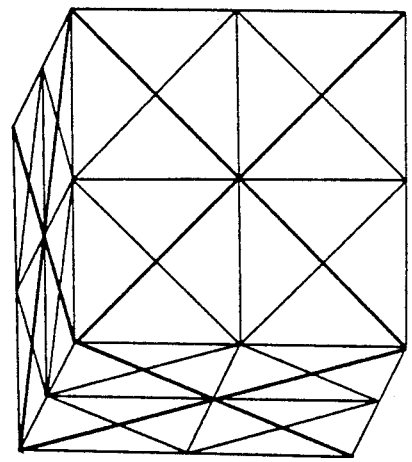

FIG. 35 shows an LCD complex cube in its duo-tetrahedron state or mode.

Figure 36:
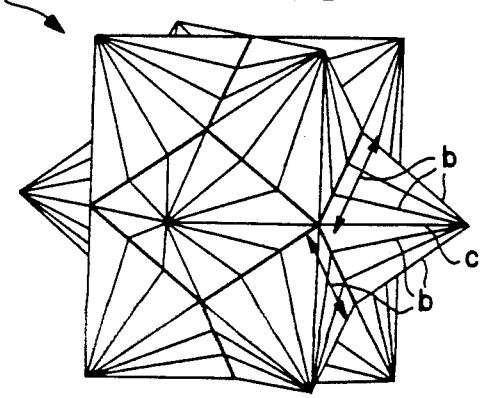

FIG. 36 presents a double LCD rhombic dodecahedron.

Figure 37:
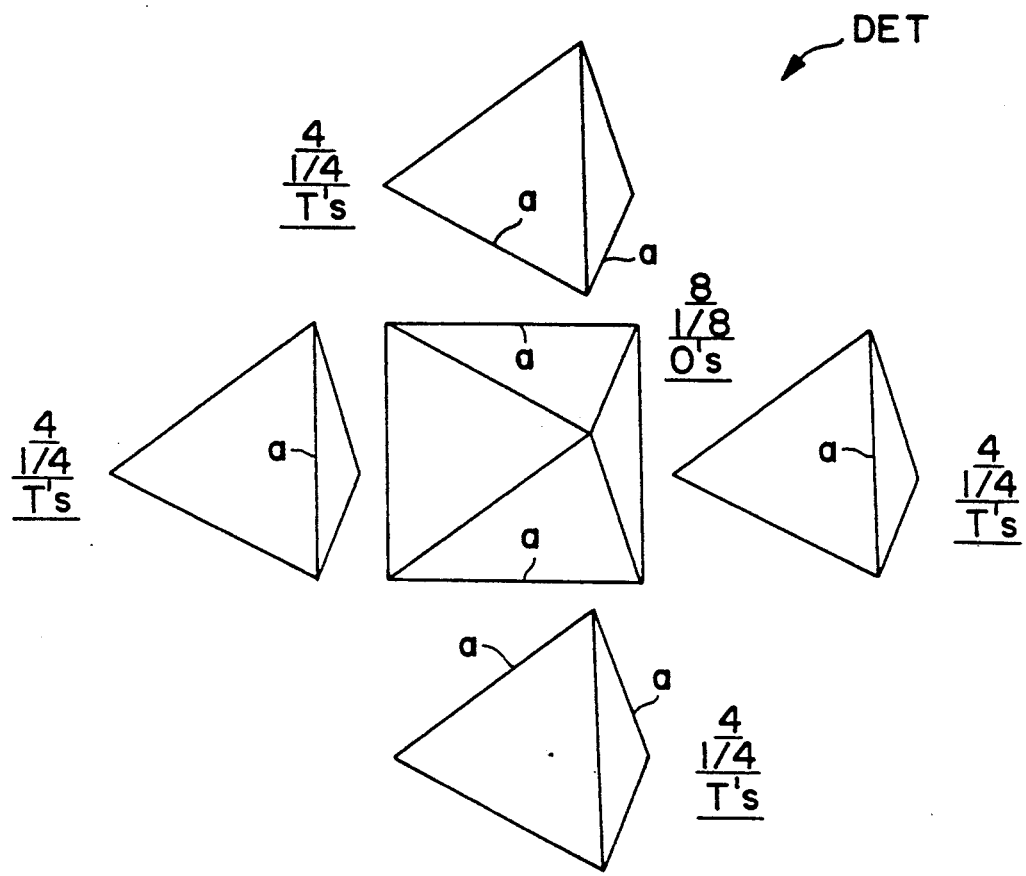

FIG. 37 shows an exploded double-edged tetrahedron which includes an octahedron core constructed from eight ⅛ O blocks (FIG. 1B) surrounded by four tetrahedrons.

Figure 38:
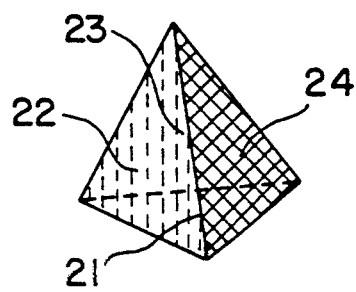

FIG. 38 shows color coding for a positive tetrahedron having a clockwise color rotation (sequence) of four colors: black, violet, green and orange.

Figure 39:
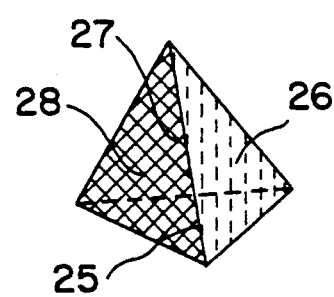

FIG. 39 shows a color coding for a negative tetrahedron having a counterclockwise color rotation (sequence) of these same four colors: black, violet, green and orange.

FIGS. 40A and 40B are used for explaining additional features and advantages of the color coordination in the present geometric block building system.

FIGS. 34A, 32A, 36A, and 28A illustrate intertransformable relationships among the symmetrical geometric forms embedded within the LCD complex cube LCXCU in its State B (the Cuboctahedron State).

FIGS. 35A, 33A, 30A, and 29A illustrate intertransformable relationships among the symmetrical forms embedded within the LCD complex cube LCXCU' in its State A (the Duo-Tetrahedron State).

DETAILED DESCRIPTION OF PREFERRED EMBODIMENT

Shown in FIG. 1A are eight identical basic building blocks ¼ T of the present, preferred sixteen-block system embodying the invention. In order to form each of these eight basic building blocks ⅟₄ T, the system is founded upon two identical regular tetrahedrons, each generally indicated by "T", and each having four identical equilateral triangular faces 12 of edge length "a". The center-of-gravity point 10 is located at the juncture of six planes. Each such plane is oriented such that it contains one of the edges "a", and the plane is perpendicular to a mid-point 5 (FIGS. 3 and 10) of an edge "a" opposite to the edge contained in the plane. In other words, each such plane for locating the center-of-gravity point 10 of a regular tetrahedron T is determined by an edge "a" of the tetrahedron T and by the mid-point 5 of the opposite edge "a".

In FIG. 10 is shown a regular tetrahedron T having an edge length "a" (considerably enlarged relative to FIG. 1A) wherein are shown various internal triangles resulting from six planes determined by a respective edge "a" and by a mid-point 5 of a respective opposite edge "a" of the regular equilateral-triangular-faced tetrahedron T.

Each of these two identical regular tetrahedrons T (FIG. 1A) is divided into four identical, basic, center-of-gravity apexed one-fourth regular tetrahedron ⅟₄ T. Each such ⅟₄ T is a tetrahedron and has a center-of-gravity ("c.g.") apex 10 with an equilateral triangular face 12 located opposite to this c.g. apex 10. The equilateral triangular face 12 of a ⅟₄ T is shown enlarged in FIG. 3 and has three edges "a". Each ⅟₄ T also has three edges of length "b" extending from its c.g. apex 10 to the three corners 16 located at the three vertices of the equilateral triangular face 12.

An edge "a" plus two edges "b" define an isosceles triangular face 14 shown enlarged in FIG. 7. Three of these isosceles triangular faces 14 plus the equilateral triangular face 12 constitute the four faces of each basic tetrahedron building block ⅟₄ T.

Four arrows 17 associated with a respective tetrahedron T illustrate the way in which the respective four ⅟₄ T's are cut out from a regular tetrahedron T of edge length "a".

Shown in FIG. 1B are the other eight identical basic building blocks ⅛ O of the present, preferred sixteen-block system embodying the invention. (The edge length "a" in FIG. 1B is drawn smaller than the same-size edge length "a" in FIG. 1A so that all components of FIG. 1B would fit on the one drawing sheet.) In order to form each of these eight basic building blocks ⅛ O, the system is founded upon one regular octahedron, generally indicated at "O" having eight identical equilateral triangular faces 12' of edge length "a". The center-of-gravity (c.g.) point 11 of the octahedron O is located at the juncture of three orthogonal (mutually perpendicular) planes. Each such orthogonal plane is oriented such that it passes through four corners of the octahedron O and contains four of its edges "a" extending between the successive four corners.

This regular octahedron O is divided into eight identical basic, center-of-gravity apexed one-eighth regular octahedron ⅛ O. Each such ⅛ O is a tetrahedron and has a center-of-gravity (c.g.) apex 11 with an equilateral triangular face 12' located opposite to this c.g. apex 11. The equilateral triangular face 12' of a ⅛ O is shown enlarged in FIG. 3 and identical with an equilateral triangular face 12 of a ⅟₄ T which also is shown in FIG. 3, as mentioned above.

Each ⅛ O thus has three edges of length "a" and also has three edges of length "c" extending from its c.g. apex 11 to the three corners 16' located at the three vertices of its equilateral triangular face 12'.

An edge "a" plus two edges "c" define an isosceles triangular face 13 shown enlarged in FIG. 4. It is noted that this triangular face 13 is an isosceles right triangle having two 45° angles indicated in FIG. 4. Therefore, an edge "c" of this 45° triangular face 13 (which may also be called a "side" "c" of the triangle 13) has a length equal to $a/\sqrt{2}$, which also may be expressed mathematically as a $\sqrt{2}/2$.

Three of these 45° isosceles right triangular faces 13 plus the equilateral triangular face 12' constitute the four faces of each basic tetrahedron building block ⅛ O. Since three of the faces 13 of a tetrahedron-shaped ⅛ O are right triangles, such a tetrahedron shape sometimes is called a "tri-rectangular tetrahedron".

Inviting attention to FIGS. 2A and 2B, a ⅛ O is shown superimposed upon a ⅟₄ T forming a pyramidal structure 18. For purposes of explaining the present invention in greater detail, the volume of the ⅟₄ T is being designated as one unit (namely, one cubic unit) of volume. The three corners 16' of the ⅛ O are shown placed exactly at the three corners 16 of the ⅟₄ T. Thus, the equilateral triangular face 12' of the ⅛ O is at the bottom surface of the pyramidal structure 18 in FIGS. 2A and 2B exactly in registration with the equilateral triangular face 12 of the ⅟₄ T which also is at the bottom surface of this pyramid 18.

IT WILL BE SHOWN THAT THE ⅛O BLOCK HAS TWICE THE VOLUME OF THE ⅟₄ T BLOCK

In FIG. 3, it is noted that the distance from any corner 16 or 16' of an equilateral triangular face 12 or 12' to a mid-point 5 of an edge (side) of length "a" is a/2. A line 6 from a mid-point 5 to an opposite corner (vertex) of the equilateral triangle 12 or 12' divides the equilateral triangle into two 30°/60° right triangles. This line 6 has a length "h", which is found by the theorem of Pythagoras; as follows:

$$(a/2)^2 + (h)^2 = a^2 \quad (1)$$

Solving for h:

$$h^2 = a^2 - (a/2)^2 = a^2 - a^2/4 = 3a^2/4 \quad (2)$$

$$h = a\sqrt{3/4} = a\sqrt{3}/2 \quad (3)$$

In FIG. 3, the reference number 9 indicates a line segment extending from a mid-point 5 to a point 7 located at the intersection of lines drawn from three mid-points 5 to respective opposite vertices 16 or 16'. Line segment 9 has a length "k".

Recognizing that a smaller 30°/60° right triangle defined by three points 5, 7 and a vertex 16 or 16' (at the right in FIG. 3) is similar to a larger 30°/60° right triangle formed by side a/2, height "h" and a hypotenuse of length "a", the following ratios can be equated due to the existence of these similar triangles, which have corresponding proportions:

$$(4) \quad \frac{a/2}{h} = \frac{k}{a/2}$$

Solving for k $$k = a^2/4h$$

Substituting h from equation (3):

$$h = \frac{a\sqrt{3}}{2}:$$

$$(6) \quad k = \frac{a^2}{4(a\sqrt{3}/2)} = \frac{a^2}{2a\sqrt{3}} = \frac{a}{2\sqrt{3}}$$

In FIG. 4, a line 8 from mid-point 5 to the c.g. vertex 11 of the 45° isosceles right triangle 13 divides this triangle into two smaller 45° isosceles right triangles. Thus, the line 8 has a length equal to a/2, since the two legs of a 45° isosceles right triangle are equal.

In FIG. 10, briefly referred to earlier, is shown a regular tetrahedron T of edge length "a" (considerably enlarged relative to "a" in FIG. 1A). The center-of-gravity point 10 is shown at the juncture of six planes defining various internal triangles. Each of these six planes contains an edge "a" and a mid-point 5 of an opposite edge "a". In FIG. 10 a line 6 drawn in an equilateral triangular face (for example line 6 in the bottom face of the tetrahedron T in FIG. 10) extending from a tetrahedron corner 19 (FIG. 10) to a mid-point 5 (FIG. 10) of an edge "a" corresponds with the line 6 in FIG. 3 extending from the upper vertex 16 or 16' to the mid-point 5 (FIG. 3). This line 6 may be considered to be the height "h" of the equilateral triangle 12 or 12'. This height "h" has a length (Please see equation 3 above) equal to a $\sqrt{3}/2$. Also, in FIG. 3 a line 9 between points 5 and 7 has a length "k" (Please see equation 6 above) equal to $a/2\sqrt{3}$. The dimensions "h" and "k" have been transferred from FIG. 3 to FIG. 10.

Thus, the distance "m" (FIG. 10) between points 7 and 19 in FIG. 10 is determined by the theorem of Pythagoras, as follows:

$$m^2 + k^2 = h^2 \quad (7)$$

Solving for m:

$$(8) \quad m^2 = h^2 - k^2 = (a\sqrt{3}/2)^2 - (a/2\sqrt{3})^2$$

$$= \frac{3a^2}{4} - \frac{a^2}{12} = \frac{8a^2}{12} = \frac{2a^2}{3}$$

$$(9) \quad m = a\sqrt{2/3} = a\sqrt{2}/\sqrt{3}$$

Turning back to FIG. 3, it is seen that a distance "n" from point 7 to the upper vertex 16 or 16' is equal to "h" minus "k". This length "n" is calculated as follows:

$$(10) \quad n = h - k = a\sqrt{3}/2 - a/2\sqrt{3} = \frac{3a - a}{2\sqrt{3}}$$

$$(11) \quad n = a/\sqrt{3}$$

This dimension "n" which equals "h" minus "k" has been transferred from FIG. 3 to FIG. 10.

In FIG. 10, the vertical distance from bottom point 7 to c.g. point 10 will be called "y". This dimension "y" also is shown in FIG. 5. This dimension "y" (FIG. 10) now can be calculated by recognizing that a smaller triangle defined by three points, namely, point 7 at the bottom of the tetrahedron T in FIG. 10, c.g. point 10 and corner point 19 is similar to a larger triangle defined by three points, namely, point 7 at the left at the top of dimension "k", point 5 at the lower left at the bottom of dimension "k" and corner point 19. Thus ratios can be equated, as follows:

$$y/n = k/m \quad (12)$$

Solving for y:

$$(13) \quad y = \frac{nk}{m} = \frac{a/\sqrt{3} \, (a/2\sqrt{3})}{a\sqrt{2}/\sqrt{3}} = \frac{a/2\sqrt{3}}{\sqrt{2}}$$

$$(14) \quad y = a/2\sqrt{6}$$

In FIG. 2B and FIG. 5, it has been shown by equation (14) that the vertical distance "y" from point 7 at the bottom of the tetrahedron T in FIG. 10 to c.g. point 10 is equal to $a/2\sqrt{6}$.

In the isosceles triangle 13 in FIG. 4, a line 8 extending between edge mid-point 5 and c.g. vertex 11 is the same as slant line 8 (FIG. 2B) in triangular face 13. Thus, line 8 in FIG. 2B in triangular face 13 also has a length equal to a/2. From FIG. 10 it is seen that line 9 in FIG. 2B between edge mid-point 5 (at the left in FIG. 2B) and bottom point 7 has length "k" equal to $a/2\sqrt{3}$ as was shown by equation (6).

The vertical height "x" (Please see right-angled triangle 20 in FIG. 6) from point 7 to c.g. vertex 11 is determined by the theorem of Pythagoras; as follows:

$$(a/2)^2 = x^2 + k^2$$

Solving for x:

$$(16) \quad x^2 = (a/2)^2 - (a/2\sqrt{3})^2 = a^2/4 - a^2/12$$

$$(17) \quad x^2 = \frac{3a^2 - a^2}{12} = \frac{2a^2}{12} = \frac{a^2}{6}$$

$$(18) \quad x = a/\sqrt{6}$$

The volume of a pyramidal structure 18 in FIGS. 2A and 2B is calculated as equal to one-third of the product of the altitude times the area of the base. The area of the equilateral triangular base 12 of the ¼ T block is identical to the area of the equilateral triangular base 12' of the ⅛ O block. The altitude "x" of the ⅛ O block is $a/\sqrt{6}$; whereas the altitude "y" of the ¼ T block is $a/2\sqrt{6}$. Thus, the altitude "x" is exactly twice the altitude "y". Therefore the volume of a ⅛ O block is exactly twice the volume of a ¼ T block. Since the volume of ¼ T has been designated herein as one cubic unit, the volume of ⅛ O has two cubic units. In summary, these two tetrahedral blocks ⅛ O and ¼ T have a very advantageous two-to-one volume ratio.

THE THREE EDGE LENGTHS "a", "b" and "c"

The first edge length "a" has been designated as a basic length.

With regard to the second edge length "b", attention is invited to FIG. 5, in which is shown a right triangle having three sides of length "b", "n" and "y". From equation (11) it is seen that "n" is equal to $a/\sqrt{3}$, and from equation (14) it is seen that "y" is equal to $a/2\sqrt{6}$.

Using the theorem of Pythagoras, the length "b" can be determined as follows:

(19) $\quad b^2 = n^2 + y^2$

(20) $\quad b^2 = (a/\sqrt{3})^2 + (a/2\sqrt{6})^2 = a^2/3 + a^2/24$

(21) $\quad b^2 = \frac{8a^2}{24} + \frac{a^2}{24} = \frac{9a^2}{24} = \frac{6a^2}{16}$ Solving for b:

$$b = a\sqrt{6}/4 \quad (22)$$

With regard to the third edge length "c", attention is invited to FIG. 4, in which the vertical line 8 divides the 45° isosceles right triangle 13 into two smaller 45° isosceles right triangles. Looking at the right one of these smaller triangles, the length "c" can be found by the Pythagorean theorem as follows:

$$c^2 = (a/2)^2 + (a/2)^2 = a^2/4 + a^2/4 \quad (23)$$

$$c^2 = 2a^2/4 = a^2/2$$

Solving for c:

$$c = a/\sqrt{2} \quad (25)$$

Summarizing, the three edge lengths are:

$a = a$ $b = a\sqrt{6}/4$ $c = a/\sqrt{2}$

GEOMETRIC FORMS WHICH CAN BE CONSTRUCTED WITH THIS SIXTEEN-BLOCK SYSTEM

With this sixteen-block system consisting of the eight ¼ T blocks in FIG. 1A and the eighth ⅛ O blocks in FIG. 1B, the user can construct a rhombic dodecahedron RD as shown in FIGS. 8 and 9.

The procedure for constructing this rhombic dodecahedron RD is initially to construct a regular octahedron O (FIGS. 1B and 1C) using eight of the ⅛ O blocks. This octahedron O has eight equilateral triangular faces 12' which are exposed. Then, the eight ¼ T blocks are placed upon the respective eight exposed faces 12' by placing an equilateral triangular face 12 of each external ¼ T block in registration against a respective equilateral triangular face 12' of the underlying octahedron O.

FIG. 9 shows a rhombic dodecahedron RD constructed by these sixteen blocks. Two of the eight external ¼ T's, namely those two in which it is possible to see all three of their respective three edges "b", are expressly pointed out in FIG. 9 by an arrow plus "¼ T".

FIG. 10 has been discussed in detail above in regard to showing that the volume of the ⅛ O block is exactly twice the volume of the ¼ T block.

FIG. 11 illustrates that with this sixteen-block system, the user can construct two cubes each of which is referenced at CU. The method for constructing each of these two cubes CU is initially to construct two tetrahedrons T (FIG. 1A) using four each of the ¼ T blocks. Each of these tetrahedrons T has four equilateral triangular faces 12 which are exposed. Then, four ⅛ O blocks are placed upon the respective four exposed faces 12 of each underlying tetrahedron by placing an equilateral triangular face 12' of each external ⅛ O block in registration against a respective equilateral triangular face 12 of the underlying tetrahedron T for completing the two cubes CU in FIG. 11. It is interesting that a c.g. apex 11 of each of four ⅛ O blocks in each cube form four of the eight corners of the cube. Only three of these c.g. apex corners 11 on each cube are visible in FIG. 11. Each of the other four corners of each cube are located at a juxtaposition point 29 where corners of three ⅛ O blocks plus corners of three underlying ¼ T blocks are all adjacent one to another.

In a manner of thinking, a rhombic dodecahedron RD (FIG. 9) is the result of turning two cube constructions CU (FIG. 11) inside out (or vice versa), since eight ⅛ O blocks are located on the inside of the rhombic dodecahedron with eight ¼ T blocks located on the outside, whereas, in each of the two cubes CU there are four ¼ T blocks located on the inside with four ⅛ O blocks located on the outside.

FIG. 12 shows that this sixteen-block system can be used to construct two regular tetrahedrons T and one regular octahedron O. The two tetrahedrons T are constructed by assembling four each of ¼ T blocks. In effect, this assembly of two tetrahedrons T is the inverse of FIG. 1A. The octahedron O is formed by putting together eight of the ⅛ O blocks, namely, the inverse of FIG. 1B.

FIG. 13 illustrates this sixteen-block system being used to construct a regular hexahedron H having six equilateral triangular faces and to construct a regular octahedron O. This octahedron O in FIG. 13 is assembled in the same manner as in FIG. 12. The regular hexahedron H in FIG. 13 is formed by putting together the two regular tetrahedrons T shown in FIG. 12. This hexahedron assembly H of the two regular tetrahedrons T is done by placing an equilateral triangular face 12 of one tetrahedron flush against, and in registration with, an equilateral triangular face 12 of the other tetrahedron.

FIG. 14 shows that this sixteen-block system can be used to construct an isosceles dodecahedron ID plus a regular octahedron O. This octahedron in FIG. 14 is constructed in the same manner as in FIGS. 12 and 13. For illustrating how the overall appearance of an octahedron will change, depending upon its orientation relative to a viewer, the octahedron in FIG. 14 is drawn in a different orientation from those in FIGS. 12 and 13. The isosceles dodecahedron ID (FIG. 14) is assembled by constructing a regular tetrahedron T using four ¼ T blocks, thereby providing four available exposed equilateral triangular faces. The four remaining ¼ T blocks have their equilateral triangular faces 12 placed flush against, and in registration with, the four available equilateral triangular faces of the underlying tetrahedron T. Consequently, twelve isosceles triangular faces 14 form the exterior surface of this isosceles dodecahedron ID.

Up to this point in the description, it has been shown that this sixteen-block system enables a user to construct all of the following geometric polyhedrons: the rhombic dodecahedron RD (FIG. 9), two cubes (FIG. 11), two regular tetrahedrons T plus a regular octahedron O (FIG. 12), a regular hexahedron H with six equilateral triangular faces plus a regular octahedron O (FIG. 13), and an isosceles dodecahedron ID plus a regular octahedron O (FIG. 14).

FIG. 15 shows that by using two each of these sixteen tetrahedral blocks and by placing them together with their equilateral triangular faces flush and in registration, it is possible to construct eight isosceles hexahedrons IH. Placing together in said manner four pairs of ¼ T blocks and four pairs of ⅛ O blocks, the result is to construct four isosceles hexahedrons IH-1 each having six isosceles triangular faces 14 and four more isosceles hexahedrons IH-2 each having six isosceles triangular faces 13.

FIG. 16 illustrates that ⅛ O blocks placed together in two sets of four blocks in each set enable construction of two pyramids P, each pyramid having a square base of edge "a" with four equilateral triangular faces 12' (only three faces 12' are seen in each pyramid P). In order to construct each pyramid P, an isosceles triangular face 13 (FIG. 4) of each of four ⅛ O blocks is faced down to form the bottom surface of the pyramid. In this bottom surface, the c.g. vertices 11 (FIG. 4) of the four isosceles triangular faces 13 are arranged to meet at the center of the bottom. Since each of these four vertices 11 is a right angle, four of them meeting at the center of the bottom surface cause the downwardly facing isosceles triangular faces 13 to construct a square base. The result of this pyramidal arrangement is that the other two isosceles triangular faces 13 of each respective ⅛ O block abut flush against, and in alignment with, respective isosceles triangular faces of adjacent ⅛ O blocks. After constructing two pyramids P, a user can arrange the eight ¼ T blocks to construct two tetrahedrons T as shown in FIG. 16. Alternatively, these eight ¼ T blocks can be used to construct a regular hexahedron H as seen in FIG. 13 or an isosceles dodecahedron ID as shown in FIG. 14 or four isosceles hexahedrons IH-1 as seen in FIG. 15.

All of the polyhedrons shown in FIGS. 9 and 11 through 16 are constructed with the novel geometric block building system, preferred embodiment of the present invention consisting of only sixteen blocks: eight center-of-gravity apexed ¼ T blocks and eight center-of-gravity apexed ⅛ O blocks derived as shown in FIGS. 1A and 1B and wherein the volume ratio of such ⅛ O block to such ¼ T block advantageously is exactly two-to-one as proven above and involving only three edge lengths "a", "b" and "c".

MORE COMPLEX POLYHEDRONS CONSTRUCTIBLE WITH FOUR SETS OF SIXTEEN BLOCKS, EACH SET CONSISTING OF EIGHT ¼ T BLOCKS AND EIGHT ⅛ O BLOCKS

Four sets of sixteen blocks with each set embodying the invention as explained above and consisting of eight ¼ T blocks and eight ⅛ O blocks provide a total of thirty-two ¼ T blocks and thirty-two ⅛ O blocks which can be used to construct more complex polyhedrons as will be explained.

FIG. 17 shows a duo-tetrahedron DT. This duo-tetrahedron can be constructed by initially assembling a regular octahedron O as shown in any of FIGS. 12, 13 and 14. This regular octahedron consists of eight ⅛ O blocks and provides eight exposed equilateral triangular faces each of edge length "a". Then, the assembly procedure continues by constructing eight regular tetrahedrons T as shown in FIGS. 12 and 16, using four each of the ¼ T blocks, namely a total of thirty-two ¼ T blocks. The regular octahedron O which initially was constructed becomes the interior geometric form. Onto each of the eight available equilateral triangular faces of this interior regular octahedron is placed a regular tetrahedron T with an equilateral triangular face of each tetrahedron being put flush against, and in registration with, the respective underlying face of the interior octahedron.

An alternative interesting procedure for constructing the duo-tetrahedron DT in FIG. 17 is initially to construct a regular octahedron O consisting of eight ⅛ O blocks, namely, the same initial phase of construction as described in the preceding paragraph. Then, onto each of the respective eight available equilateral triangular faces of this interior octahedron is placed one ¼ T block, thus using a total of eight ⅛ O blocks plus eight ¼ T blocks, thereby constructing the sixteen-block regular rhombic dodecahedron RD, as shown in FIGS. 8 and 9, which consequently becomes a second (or intermediate) interior geometric form surrounding the initial regular octahedron. For purposes of explanation, this regular rhombic dodecahedron RD is again illustrated in FIG. 17A. It will be recognized that this rhombic dodecahedron RD in FIG. 17A consists of the basic sixteen building blocks of the presently preferred embodiment of this invention. In looking closely at the regular rhombic dodecahedron RD (FIG. 17A) it will be seen that there are eight corners (vertices) 10 each of which constitutes a center-of-gravity point 10 (FIGS. 1A and 10) of a regular tetrahedron T. These eight c.g. points 10 then are used as centers for constructing a tetrahedron T (FIG. 17) around each respective c.g. point 10 in the final phase of assembly of the duo-tetrahedron DT (FIG. 17). In order to construct a tetrahedron around each c.g. point 10 in FIG. 17A, three ¼ T blocks are used. Since there are eight c.g. points 10 and since each such point has three ¼ T blocks assembled around it, this final phase of assembly uses twenty-four more ¼ T blocks in addition to the eight ¼ T blocks already used for making the intermediate rhombic dodecahedron RD (FIG. 17A) surrounding the initial interior octahedron. Thus, thirty-two ¼ T blocks plus eight ⅛ O blocks, namely the same as before, are used in this alternative procedure for constructing the duo-tetrahedron DT (FIG. 17).

FIG. 18 shows a cuboctahedron CUO constructed from thirty-two ¼ T blocks plus twenty-four ⅛ O blocks. The procedure for constructing this cuboctahedron CUO is to recognize that it consists of six pyramids P each consisting of four ⅛ O blocks, plus eight tetrahedrons T each consisting of four ¼ T blocks, thus being a total of thirty-two ¼ T blocks as stated in FIG. 18. Each pyramid P has a square base, as will be understood from FIG. 16. It is square bases of the six pyramids which form six square faces of edge length "a" of the cuboctahedron CUO, but only three of these square surfaces of pyramids P can be seen in the perspective view in FIG. 18. These six pyramids in the cuboctahedron CUO are arranged with their apexes all adjacent one to another at the center of the cuboctahedron, then each of the eight tetrahedrons T is placed adjacent to three of the pyramids P with the three respective equilateral triangular faces 12 (FIG. 12 or 16) of each tetrahedron being placed flush against and in registration with respective three equilateral triangular faces 12' (FIG. 16) of three adjacent pyramids P. The apexes of the eight tetrahedrons T and of the six pyramids P all are adjacent one to another at the center of the cuboctahedron CUO.

FIG. 19 shows a complex cube CXCU consisting of thirty-two ¼ T blocks plus thirty-two ⅛ O blocks. One procedure for constructing this complex cube CXCU is to envision that it is made by assembling an underlying cuboctahedron CUO (FIG. 18), thereby providing eight exposed equilateral triangular faces 12 of which only four can be seen in FIG. 18. Then, a ⅛ O block is placed flush onto each of the eight exposed faces 12 by putting an equilateral triangular face 12' (FIG. 1 B) of each ⅛ O block in registration with an equilateral triangular face 12 (FIG. 18) of the cuboctahedron CUO. The result of such placement of the eight ⅛ O blocks is their center-of-gravity apexes 11 become the respective eight corners of the complex cube CXCU. In order to help a reader better visualize the underlying cuboctahedron CUO (FIG. 18) contained within the complex cube CXCU (FIG. 19), the respective square faces of the underlying cuboctahedron are drawn darker in FIG. 19 than other lines.

Another way to approach construction of the complex cube CXCU is to see that it consists of eight cubes CU (FIG. 11) which serve as eight subassemblies. Then these eight cube CU subassemblies are brought together with respective ones of these cubes forming the eight corner portions of the resulting complex cube CXCU.

Noting that a cube CU in FIG. 11 has four corner points 11 which are center-of-gravity apexes of ⅛ O blocks and also have four other corner points 29 which are junction points, it will be appreciated that the eight cube CU subassemblies can be brought together into the complex cube CXCU in two different ways, namely with their c.g. vertices 11 located at the eight corners of the complex cube, as in shown in FIG. 19, or alternatively with their junction points 29 located at the eight corners of another complex cube CXCU', as is shown in FIG. 20, which will be discussed later.

When the c.g. apex points 11 of eight ⅛ O blocks are located at the eight corners of the complex cube CXCU, as occurs in FIG. 19, then this complex cube is in its Cuboctahedron State (or Mode), because the underlying geometric structure is a cuboctahedron CUO (FIG. 18) as was explained above.

When the junction points 29 of eight cubes CU (FIG. 11) are positioned at the eight corners of the complex cube CXCU' (FIG. 20), then this complex cube is in its Duo-Tetrahedron State (or Mode). In order to reveal more clearly the duo-tetrahedron DT (FIG. 17) contained within this complex cube CXCU', the respective edges of the underlying duo-tetrahedron are drawn darker in FIG. 20 than other lines.

A way to convert a complex cube CXCU in its cuboctahedron state into a complex cube CXCU' in its duo-tetrahedron state is to divide the first cube CXCU into two halves by separating along any one of three orthogonal planes. For example, one of such three possible orthogonal separation planes is indicated by the arrows each with a circled "S" (FIG. 19). After the two halves of the complex cube CXCU have been separated, each half is rotated 180° around a vertical axis, and the two halves are brought back together, thereby constructing the duo-tetrahedron complex cube configuration CXCU' (FIG. 20).

From this discussion of its duo-tetrahedron state, it will be appreciated that an interesting approach for constructing the complex cube CXCU' (FIG. 20) is to proceed through the stages of making a duo-tetrahedron DT (FIG. 17) as explained above. It is noted that the duo-tetrahedron DT (FIG. 17) contains a rhombic dodecahedron RD (FIG. 17A) which in turn contains an octahedron O (FIG. 1B). After constructing the duo-tetrahedron containing thirty-two ¼ T blocks and eight ⅛ blocks, then, to complete construction of the complex cube CXCU', twenty-four more ⅛ O blocks are placed onto the equilateral triangular faces (three faces each) of the eight tetrahedrons T which constitute the eight star-like projections of the duo-tetrahedron DT, thereby completing the complex cube CXCU' (FIG. 20).

In summarizing the various progressively more complex geometric forms which can be constructed by four of the basic sixteen-block sets, each set containing eight of the ¼ T blocks and eight of the ⅛ O blocks, it is noted there is a logical coherence of the forms advantageously resulting from their three (and only three) edge lengths "a", "b" and "c" and from their exact volume ratio of two-to-one and resulting from the fact that they both have equilateral triangular faces of edge length "a" and from an advantageous fact that two (and no more than two) different blocks are involved and they both are center-of-gravity apexed. Since both of these two blocks are center-of-gravity apexed they uniquely enable the block builder who is using them to proceed through various progressively more complex delightfully symmetrical geometric forms in logical coherence.

As a result, the user of the present system, given the limited number of two structural elements, ¼ T and ⅛ O, their symmetry, and the common equilateral triangular face and edge length, can easily visualize, for example, that the equilateral triangular face on one block is to mate with the identical face on another block. The common edge length, too, helps to eliminate uncertainty in the matching and assembling of blocks. Heterogeneity of structures, faces, and edges largely has been eliminated, as has guesswork and confusion in block assembly. At the same time, the present system promotes an awareness of the logical progression and relationships of the structural elements of the system, and, most importantly, of geometry. For the same reasons, the present system permits the creation of a larger variety of forms than previous systems, forms which at the same time are much more economical in terms of number of elements and bulk.

Not only is the present system novel in its ability to create in a simple and logical way a broad range of structural forms of increasing complexity, as well as a simple and logical system for doing so, it is commensurately capable of providing a simple and coherent system for restructuring a given geometric form into other forms. Therefore, in assembly, disassembly, and reformation the present system is a uniquely satisfactory educational tool.

Following is a description of a few of the essentially unlimited transformations of structural forms into other forms of which the present system is capable: Illustratively, for example, these two blocks in four sets of sixteen in each set, thus consisting of thirty-two ¼ T blocks and thirty-two ⅛O blocks may be used to create two basic forms: in the first state (State "A"), the result is a "duo-tetrahedron" formed from an octahedron surrounded by eight tetrahedra (as shown in FIG. 17). In the second state (State "B"), the result is a cuboctahedron (please see FIG. 18). These two States A and B are freely interconvertible.

In a variant on the transformation process involving the "duo-tetrahedron" shown in FIG. 17, the complex cube shown in FIG. 20 can be broken down into the "duo-tetrahedron" shown in FIG. 17 plus three octahedra. In a parallel transformation, the complex cube of FIG. 19 breaks down into the cuboctahedron of FIG. 18, with a remaining octahedron.

The "duo-tetrahedron" (referred to above) of State A freely may be converted into the cuboctahedron of State B, and vice versa. In addition, these respective geometric State A and State B configurations can be converted into:

(a) eight tetrahedra plus four octahedra;
(b) a cuboctahedron plus one octahedron;
(c) a double tetrahedron plus three octahedra;
(d) four isosceles dodecahedra and four octahedra;
(e) eight cubes each formed from a tetrahedron consisting of four ¼ T blocks surrounded by four ⅛ O blocks;
(f) four rhombic dodecahedra;
(g) two complex tetrahedra, each made of four tetrahedra, each of which is formed from four ¼ T blocks, surrounding an octahedron formed with eight ⅛ O blocks, with two remaining octahedra.

COMPLEX GEOMETRIC STRUCTURES CONSTRUCTIBLE WITH 1/24 T BLOCKS AND 1/96 O BLOCKS BOTH HAVING FOUR OF THEIR SIX EDGE LENGTHS EQUAL TO ½a, b, y, AND w AND WHEREIN THE VOLUME RATIO IS ONE-TO-ONE

FIGS. 21, 22 and 23 show the way to form 1/24 T blocks and 1/96 O blocks from a ⅛ O block superimposed upon a ¼ T block. It will be seen that FIG. 22 looks like FIG. 2A. However, in FIG. 22, the volume of the ¼ T block (shown shaded) is now being subtracted from the volume of the ⅛ O block. Since it has already been shown above that the volume ratio of the ⅛ O block to the ¼ T block is two-to-one, it will be appreciated that subtracting the volume of the ¼ T block from the ⅛ O block, will leave an upper volume portion of the ⅛ O block which now is equal to the volume of the ¼ T block.

Then, as seen in FIG. 21, this upper volume portion of the ⅛ O is divided into six smaller blocks, which are called 1/96 O blocks, since each such block has one ninety-sixth of the volume of the originating octahedron. Looking more closely at FIG. 21, it will be noted that these six 1/96 O blocks include three left blocks "L" and three right blocks "R".

FIG. 23 shows the ¼ T divided into six 1/24 T blocks. Since (as explained above) the upper portion of the ⅛ O block has a volume equal to the ¼ T block, the result is that each of these six 1/24 T blocks has a volume exactly equal to the volume of each of the 1/96 O blocks. The six 1/24 T blocks in FIG. 23 include three left blocks "L" and three right blocks "R". The six edge dimensions of each 1/24 T block are a/2, "b", "k", "y", "n" (FIG. 2B) and the distance "w" in FIG. 7 from 5 to 10. The apex 10 of each 1/24 T block is a center-of-gravity point 10 of the originating tetrahedron T (FIGS. 1A and 10). Thus these 1/24 T blocks are center-of-gravity apexed.

The six edge dimensions of each 1/96 O block are a/2, a/2, "c", "b", "w" and "x" minus "y" in FIGS. 2 B and 5. Since "x" (FIG. 5) is twice the length of "y", then "x" minus "y" equals "y". Thus the sixth edge length of a 1/96 O block is "y". The apex 11 of each 1/96 O block is a center-of-gravity point 11 (FIG. IB) of the originating octahedron O, and thus these 1/96 O blocks are center-of-gravity apexed.

It is noted that the 1/24 T blocks and the 1/96 0 blocks have a one-to-one volume ratio and they both have four corresponding edge lengths, namely a/2, "b", "y" and "w". (Actually the 1/96 O block has two edges each equal to a/2; thus, the 1/96 O block has five of its six edges equal in length to edges of the 1/24 T block.) The 1/24 T block has only two edge lengths "k" and "n" which differ from the one edge length "c" of the 1/96 O block.

FIG. 24 shows an LCD ⅛ octahedron ⅛ O' and also shows the twelve blocks which are assembled to make this LCD structure. There are six 1/24 T blocks (three "L" and three "R") plus six 1/96 O blocks (three "L" and three "R").

At this point in the detailed description it will be assumed that the reader has become familiar with the distinction between left "L" and right "R" 1/24 T blocks and between left "L" and right "R" 1/96 O blocks. Therefore, for clarity of illustration from now on, L's and R's will not be referenced in the FIGURES.

FIG. 25 shows an LCD cube CU' consisting of four ⅛ O regions, and also there is an internal regular tetrahedron as was explained in connection with FIG. 11. That internal tetrahedron consists of four ¼ T regions each of which consists of six ¼ T blocks, as seen from FIG. 23. Thus, that internal regular tetrahedron consists of twenty-four 1/24 T blocks. In addition, as seen from FIG. 24, each of the four ⅛ O region in the LCD cube CU' (FIG. 25) consists of six 1/24 T blocks plus six 1/96 O blocks, thereby yielding an additional twenty-four 1/24 T blocks plus twenty-four 1/96 O blocks. Consequently, the sum total of blocks for constructing the LCD cube CU' of FIG. 25 is 48 1/24 T blocks and 24 1/96 O blocks.

FIG. 26 shows an exploded LCD cube CU' in which many of the 1/24 T blocks and 1/96 O blocks can be seen.

FIG. 27 shows an LCD isosceles dodecahedron ID'. It consists of eight ¼ T regions, and each such ¼ T region consists of six 1/24 T blocks, as shown in FIG. 23. Therefore, the LCD isosceles dodecahedron ID' (FIG. 27) consists of forty-eight 1/24 T blocks.

FIG. 28 shows an LCD rhombic dodecahedron RD'.

FIG. 28A illustrates an LCD rhombic dodecahedron, in which a regular tetrahedron forms the inner core.

FIG. 29 is a perspective view of an LCD octahedron O' constructed with eight ⅛ O regions, each ⅛ O region consisting of six 1/24 T blocks plus six 1/96 O blocks. Therefore, this LCD octahedron O' consists of forty-eight 1/24 T blocks plus forty-eight 1/96 O blocks.

FIG. 30 is a perspective view of an LCD rhombic dodecahedron LRD' having an underlying octahedron core.

FIG. 31 shows an exploded view of the LCD rhombic dodecahedron LRD' of FIG. 30, which has an LCD octahedron core O' (FIG. 29). Since the LCD octahedron core O' consists of 48 1/24 T blocks plus 48 1/96 O blocks, as explained for FIG. 29, the LCD rhombic dodecahedron RD' (FIG. 30) includes an overall total of 96 1/24 T blocks plus 48 1/96 O blocks.

FIG. 32 shows an LCD cuboctahedron CUO' consisting of 32 ¼ T regions and 24 ⅛ O regions, as understood from FIG. 18. Each ¼ T region, as understood from FIG. 23, consists of six 1/24 T blocks, thereby making a sub-total of 192 1/24 T blocks. In addition, each ⅛ O region, as understood from FIG. 24, consists of six 1/24 T-blocks and six 1/96 O blocks, thereby making another sub-total of 144 1/24 T blocks plus 144 1/96 0 blocks. Consequently, the overall total for the cuboctahedron CUO' of FIG. 32 is 336 1/24 T blocks plus 144 1/96 O blocks, thereby making a combined total of 480 blocks of both types.

FIG. 33 shows an LCD duo-tetrahedron DT'. As known from FIG. 17, this duo-tetrahedron consists of 32 ¼ T regions plus 8 ⅛ O regions. From calculations in the preceding paragraph it is seen that the 32 ¼ T regions consist of a sub-total of 192 1/24 T blocks. In addition, the 8 ⅛ O regions consist of a sub-total of 48 1/24 T blocks plus 48 1/96 O blocks, thereby making an overall total of 240 1/24 T blocks plus 48 1/96 blocks, thereby making a combined total of 288 blocks of both types.

FIG. 34 shows an LCD complex cube LCXCU of the cuboctahedron state. From FIG. 19 it is known that this structure includes 32 ¼ T regions and 32 ⅛ O regions. As seen from FIGS. 32 and 33, it is known that 32 ¼ T regions consist of 192 1/24 T blocks. From FIG. 24 it is known that each ⅛ O region consists of six 1/24 T blocks and six 1/96 O blocks. Thus, the 32 ⅛ O regions consist of an additional 192 1/24 T blocks plus 192 1/96 O blocks. Consequently, the overall total is 384 1/24 T blocks plus 192 1/96 O blocks, making a combined total of 576 blocks of both types.

FIG. 35 shows an LCD complex cube LCXCU' of the duo-tetrahedron type. From FIG. 20 and FIG. 34, it is seen that this LCD complex cube consists of the same number and type of blocks as in FIG. 34, namely 384 1/24 T blocks plus 192 1/96 0 blocks, making a combined total of 576 blocks of both types.

FIG. 36 shows a double LCD rhombic dodecahedron DRD'. It is constructed by placing twelve additional irregular pyramids (each oriented with its apex pointed outwardly) onto the twelve rhombic faces of the LCD rhombic dodecahedron RD' shown in FIG. 28. The LCD rhombic dodecahedron RD' of FIG. 28 originally was constructed by using twelve irregular pyramids with their apexes all pointed inwardly into the center of the LCD rhombic dodecahedron RD' so that the twelve rhombic bases of these original twelve pyramids form the twelve rhombic faces seen in FIG. 28. Since the double LCD rhombic dodecahedron DRD' includes twelve more irregular pyramids in addition to the twelve original irregular pyramids, this double LCD rhombic dodecahedron DRD' consists of twice as many blocks as in FIG. 28, thereby making a total of 192 1/24 T blocks and 96 1/96 0 blocks for an overall combined total of 288 blocks.

FIG. 37 shows an exploded double-edge tetrahedron DET which has an octahedron core constructed from eight ⅛O blocks with four regular tetrahedrons shown near the octahedron core, each such regular tetrahedron consisting of four ¼ T blocks.

With regard to the system using the 1/24 T block and the 1/96 O block, there is a logical coherence of forms advantageously resulting from the fact that their edge lengths a/2 "b", "y" and "w" are equal, and these two blocks have exactly a volume ratio of one-to-one and both of them are center-of-gravity apexed. Since they are center-of-gravity apexed a user is uniquely able to proceed through various, numerous, progressively more complex geometric forms, each of which is a delightfully symmetrical geometric structure characteristic of the present system.

Relatively more complex structures also may be formed according to the present invention which also freely may be converted into States A and B. An example is an LCD complex cube formed from 576 blocks, which freely can be converted from State A to State B, and the reverse. In its State A Form, namely, the LCD complex cube LCXCU' shown in FIG. 35, this complex cube LCXCU' has at its core an LCD octahedron O' shown in FIG. 29, which is embedded within the rhombic dodecahedron RD' shown in FIG. 30, which itself is embedded within the LCD duo-tetrahedron DT' shown in FIG. 33, which itself is embedded within the LCD complex cube LCXCU' shown in FIG. 35. This State A of the LCXCU' complex cube (FIG. 35) may also be called the Duo-Tetrahedron State (or Mode) as seen from FIG. 20.

In the State B variant, the LCD complex cube contains the rhombic dodecahedron shown in FIG. 28, wherein all of the acute corners (apexes) of the 144 structural elements point inward toward the center of the structure. This rhombic dodecahedron RD' shown in FIG. 28 is embedded within the LCD double rhombic dodecahedron DRD' shown in FIG. 36, which itself is embedded within the LCD cuboctahedron CUO' shown in FIG. 32, which itself is embedded within the State B LCD complex cube LCXCU in FIG. 34. This State B of the LCD complex cube LCXCU (FIG. 34) may also be called the Cuboctahedron State (or Mode) as seen from FIG. 19.

In this example, both States A and B each may produce four rhombic dodecahedra, three of which are not identical: (a) that with an octahedron core, as shown in FIGS. 31 and 30; (b) that shown in FIG. 28, wherein the acute corners of the twelve irregular pyramids all point inward to the center of the structure; and (c) a rhombic dodecahedron (tetrahedron cored, FIG. 28A) in which the LCD 1/24 T and 1/96 O blocks construct an intermediate cube around the tetrahedron core formed from twenty-four 1/24 T blocks. The fourth of the rhombic dodecahedra is identical to any on of rhombic dodecahedra (a) through (c).

In a tetrahedron-octahedron block system assembly of the present invention, there are three kinds of vertices: (1) tetrahedron-octahedron vertices 29 as shown in FIG. 11 and FIG. 20; (2) the centers of gravity points 10 of tetrahedrons; nd (3) the centers of gravity points 11 of octahedra.

As may be seen from the above, the simplicity and ease of use of the present system aids the educational function of the present system by providing easily intelligible conversion of structural forms to a variety of other structural forms. Such formation and conversion is possible at all levels of geometric complexity, from the very simple, with few elements, to the very complex, with many elements. More importantly, the present system demonstrates clearly to the user the relationships between the blocks and the process of their formation. It will be understood that the above-described examples are only a small representative sample of the almost infinite variety of formations and transformations of which the present system is capable.

FIG. 38 shows a color coding sequence used to indicate a "positive" tetrahedron. A "positive" geometric tetrahedron form as this "positive" term is used herein means a clockwise rotational sequence of colors. For example, this positive sequence in FIG. 38 includes the four colors Black-Violet-Green-Orange.

FIG. 39 shows a color coding for a "negative" tetrahedron. A "negative" geometric tetrahedron form as this "negative" term is used herein means a counterclockwise rotational sequence of colors. For example, this negative sequence in FIG. 39 includes the four colors Black-Violet-Green-Orange in a counterclockwise rotational sequence. The color Black is on the bottom face of the tetrahedrons in FIGS. 38 and 39.

COLOR COORDINATION IN THE PRESENT SYSTEM

All of the geometric structures of the present invention may exist in mirror-image form. The tetrahedron that assumes a clockwise rotation about a (theoretical) axis is herein defined as rotationally "positive". The mirror-image of the same tetrahedron, with a counter-clockwise rotation, is defined as rotationally "negative". In FIG. 38 is shown a "positive" tetrahedron, with a clockwise rotation. The faces of the "positive" tetrahedron are shown in FIG. 38 as 21, 22, 23, and 24, respectively. Face 21 on the bottom is black, face 22 at the left is violet, face 23 (on the rear, not seen) is green, and face 24 at the right is orange. In FIG. 39 is shown its mirror image, with a counterclockwise rotation. The faces of the "negative" tetrahedron are shown in FIG. 39 as 25, 26, 27 and 28, respectively. Face 25 on the bottom is black, face 26 at the right is violet, face 27 (on the rear, not seen) is green and face 28 at the left is orange. As will better be described below, a preferred embodiment of the present invention contemplates a color coordination system, which takes into account such differences in rotation and makes them comprehensible and usable in the system of the present invention.

As is set forth above, the present system is a novel comprehensive system for the assembly or disassembly of geometric blocks into more complex or different structures. Assembly is facilitated by the minimal number of structural elements required by the present system, by the minimal number of block faces which the user has to recognize and manipulate, and by the common edge length presented by the blocks of the present system. In short, the block elements of the present system are in themselves capable of easy and logical assembly or disassembly.

Although the blocks of the present system do not require it, operation of the present system is facilitated by the color-coordination system described below. Very young users of the system may not need to use the present color system, but on the other hand, may find it helpful. Certain users may wish to use the color system because it not only makes geometrical and structural relationships even clearer and therefore makes the system easier to use, but it also increases the challenge to the user by making possible ever more complex or diverse structures, thereby opening up the potential of the system. The color system therefore is likely to be used by older and/or more sophisticated users.

As is stated above, the essential building elements of the present system are tetrahedra and octahedra, and center-of-gravity apexed subdivisions thereof. In very general terms, and as has been described in more detail above, in the present system these two forms, ¼ T blocks and ⅛ O blocks, and/or their subunits, 1/24 T blocks and 1/96 O blocks, make use of the common faces and edge lengths of the forms of the present system, which may be fitted together to form more complex forms. The color system of the present invention is coordinated with the faces of the tetrahedron and octahedron. In a preferred embodiment, the present system contemplates the use of the colors black, violet, green and orange, for each of the four equilateral-triangular faces of the "positive" tetrahedron, and the same colors, namely, black, violet, green and orange, for each of the four equilateral-triangular faces of the "negative" tetrahedron. For example, in FIG. 38, faces 21, 22, 23 and 24 are colored black, violet, green and orange, respectively, and in FIG. 39, the "negative" counterpart, faces 25, 26, 27 and 28 also bear the colors black, violet, green and orange. The same colors, namely, black, violet, green and orange, are used for the two alternate sets of the four equilateral-triangular faces of the octahedron.

The present color system also takes into account the subcomponents of the tetrahedron and octahedron, namely, the ¼ T block and the ⅛ O block. IN a preferred embodiment, the present system distinguishes the ¼ T block and the ⅛ O block from the tetrahedron and octahedron by assigning the non-equilateral faces of the ¼ tetrahedron and the ⅛th octahedron the primary colors blue, yellow and red.

It has been determined that the colors black, violet, green and orange are particularly effective for use with the present system. Nevertheless, other colors may be used, if particular circumstances so dictate or if desired. As stated above, in a preferred embodiment, all equilateral-triangular tetrahedron-octahedron faces have been assigned the colors black, violet, green and orange, and the non-equilateral faces of the ¼ tetrahedra and the ⅛th octahedra have been assigned the colors blue, yellow and red. In this embodiment, therefore, the present system contemplates a total of no more than seven colors.

The present color system further provides for the integration of a numerical system with the color system herein described. Such a numerical system is not required in the operation of the present system, but, some, for example, those supervising or teaching the use of the present geometric building block formation system, may find it useful.

Accordingly, in the preferred embodiment herein described, the four equilateral faces of the "positive" tetrahedron (FIG. 38) which have been assigned the colors black, violet, green and orange, are assigned the numbers 1A, 2A, 3A and 4A, respectively (please see faces 30, 31, 32 and 33 of the top row of figures of FIG. 40A). The four equilateral faces of the reverse oriented tetrahedron (see faces 30, 31, 32 and 33 of the bottom row of FIG. 40A), a "negative" tetrahedron, have been assigned the numbers 1B, 2B, 3B and 4B, respectively, also corresponding to the colors black, violet, green and orange. It will be understood that these specific numbers here referred to may be substituted by other designations, if desired. The non-equilateral faces of the ¼ tetrahedra are, as stated above, assigned the colors blue, yellow and red (please see faces 34, 35 and 36, respectively, of the figures of FIG. 40A). Similarly, the eight equilateral faces of the octahedron (please see FIG. 40B) are assigned four "positive" tetrahedron positions IA, 2A, 3A and 4A (top row of FIG. 40B), and four "negative" tetrahedron positions IB, 2B, 3B and 4B (bottom row of FIG. 40B), corresponding to black, violet, green and orange (please see faces 50, 51, 52 and 53 respectively, of FIG. 40B). The non-equilateral faces of the ⅛th octahedra whose equilateral faces occupy "positive" tetrahedron positions have been assigned the colors blue, yellow and red, and the numbers "1-a", "2-a" or "3-a", respectively, (blue corresponding to "1", yellow, "2", and red, "3") (please see faces 54, 55 and 56, respectively, of the top row or FIG. 40B). Consistent with this theme, the non-equilateral faces of the ⅛th octahedra whose equilateral faces occupy "negative" tetrahedron positions are assigned the colors blue, yellow and red and the numbers "1-b", "2-b" and "3-b", respectively (please see faces 54, 55 and 56, respectively, of the bottom row of FIG. 40B).

In a further embodiment of the present invention the non-equilateral faces of the ith octahedra whose equilateral faces occupy "positive" tetrahedron positions have been assigned the numbers 1b, 2a, 3b—, 1a, 2b, 3b—, 1a, 2a, 3a—, 1b, 2b, 3a (please see faces 54, 55 and 56, respectively, of the top row of FIG. 40B). The non-equilateral faces of the ith octahedra whose equilateral faces occupy "negative" tetrahedron positions are assigned the numbers 1a, 2b, 3a—, 1b, 2a, 3a—, 1b, 2b, 3b—, 1a, 2a, 3b (please see faces 54, 55 and 56, respectively of the bottom row of FIG. 40B). In this further embodiment of the present invention the two blue, two yellow and two red faces of the cube produce the series: 1a (blue face), 1b (blue face); 2a (yellow face), 2b (yellow face); and 3a (red face), 3b (red face).

The present system therefore provides assistance in joining the relatively few system blocks in several ways: at the simplest level, it will be clear to all but perhaps the youngest users of the system that like faces are to be joined; i.e., an equilateral-triangular face of one block must join with an equilateral-triangular face of another block. Correspondingly, but at a somewhat higher level of sophistication, equal edge lengths must be matched. At the next level, a colored face of one block (i.e., violet) may be joined with a similarly colored (e.g., violet) face of another block. At the next, more sophisticated level, block faces denoted "A" and "B" join with similarly designated faces of other blocks (i.e., face IA joins with another IA) and "a" faces join with "b" faces of the same number (i.e., 1a joins with 1b, 2a joins with 2b, and 3a joins with 3b ).

The above seven-color system is intended to be used, as described above, with letters ("A'"s, and "B'"s, "a'"s, and "b'"s), and numbers, (e.g., 1A, 2B, 3A, and 1a, 2b, 3a ) in order to take account of the rotation of the positive and negative tetrahedrons around the four pairs of diametrically opposed octahedron faces. In a further embodiment the present invention contemplates the expansion of the seven-color system into a ten-color system, whereby the letters and numbers required to be used with the seven-color system are the same but may be ignored. In the ten-color system, violet becomes red-violet and blue-violet, green becomes blue-green and yellow-green, and orange becomes yellow-orange and red-orange. In the ten-color system, there are two distinct color-coordinated tetrahedra: the first has black, red-violet, blue-green, and yellow-orange faces and the second has black, blue-violet, yellow-green, and red-orange faces. In the expanded-color embodiment of the present system, the younger user may focus on color alone in fitting blocks and ignore the rotational letter number designations. Again, of course, other ten-color combinations may be used.

DESCRIPTION OF CONNECTOR SYSTEM

The blocks described herein are largely intended to be used by children. They therefore necessarily must be lightweight and yet capable of withstanding substantial shock. Such blocks therefore preferably will be constructed from lightweight, thin-walled, but relatively tough and resilient materials, such as cardboard or lightweight plastics. According to the present system, the elements (blocks) thereof must be firmly but removably attachable, one to the other, by means which are easily manipulated by children. Such means may be provided by magnets or detachable attachment means such as "Velcro", i.e. hook-and-loop-type fasteners, but both of these means have limitations which make them less suitable for use with the blocks contemplated by the present system. Among other reasons, magnets are relatively heavy and are not especially suitable for use with lightweight, thin-walled materials. Also, because of the problems of polarity, they are not necessarily easily manipulated by children. "Velcro"-type attachment devices wear out, are expensive, and are not necessarily easily detachable by young children.

The preferred attachment means contemplated by the present system are lightweight connectors, specially adapted to provide for easy attachment, insertability, and removability in the thin-walled, lightweight constructions materials contemplated by the present invention. Such preferred connectors are described in my U.S. Pat. No. 5,067,848, issued Nov. 26, 1991 The full disclosure of said patent is incorporated herein by reference. Although such connectors are preferred, the present invention contemplates any attachment means which will accomplish the same result, namely easy attachability and detachability in lightweight, thin-walled materials.

While the preferred embodiments of the present invention have been described above, it will be understood that this description is intended to illustrate and not limit the scope of the invention, which is described by the following claims.

I claim:

1. A sixteen-block, geometric block system for constructing a regular rhombic dodecahedron having twelve identical rhombic-shaped faces, said sixteen block system consisting solely of:
   eight identical first blocks and
   eight identical second blocks;
   each of said eight identical first blocks being one quarter of a regular tetrahedron;
   said regular tetrahedron having six equal edges each of length "a" and having four identical equilateral triangular faces each having three sides each of length "a";
   each of said eight identical first blocks having an apex at a point corresponding with the center of gravity of said regular tetrahedron;
   each of said eight identical first blocks having four faces consisting of first, second, third and fourth triangular faces;
   said first triangular face being an equilateral triangular face having three edges each of length "a";
   said second, third and fourth triangular faces each being an isosceles triangular face having one edge of length "a" and two edges of length "b";
   said length "b" being equal to $a\sqrt{6}/4$;
   each of said eight identical first blocks having a volume of one cubic unit;
   each of said eight identical second blocks being one eighth of a regular octahedron;
   said regular octahedron having eight equal edges each of length "a" and having eight identical equilateral triangular faces each having three sides each of length "a";
   each of said eight identical second blocks having an apex at a point corresponding with the center of gravity of said regular octahedron;
   each of said eight identical second blocks having four faces consisting of fifth, sixth, seventh and eighth triangular faces;

said fifth triangular face being an equilateral triangular face having three edges each of length "a";

said sixth, seventh and eighth triangular faces each being an isosceles triangular face having one edge of length "a" and two edges of length "c";

said length "c" being equal to $a/\sqrt{2}$;

each of said eight identical second blocks having a volume of two cubic units;

construction of said regular rhombic dodecahedron being characterized by initially assembling in face-to-face relationship the sixth, seventh and eighth isosceles triangular faces of all of the eight identical second blocks with their edges of length "c" being aligned and with all of their apexes being adjacent one to another; and construction of said regular rhombic dodecahedron being further characterized by finally assembling in face-to-face relationship a respective first equilateral triangular face of one of said eight identical first blocks with a respective fifth equilateral triangular face of one of said eight identical second blocks with the edges of length "a" of said first equilateral triangular faces being aligned with and adjacent to the edges of length "a" of said fifth equilateral triangular faces;

thereby constructing a regular rhombic dodecahedron having twenty four units of cubic volume and having twelve identical rhombic-shaped faces and wherein each of said identical rhombic-shaped faces has four edges each of length "b" equal to $a\sqrt{6}/4$.

2. A geometric block system as claimed in claim 1 in which:
   each of said identical first blocks is assembled from six tetrahedron subdivision blocks;
   each of said six tetrahedron subdivision blocks is 1/24th of said regular tetrahedron;
   each of said six tetrahedron subdivision blocks has an apex at a point corresponding with the center-of-gravity of said regular tetrahedron;
   each of said identical second blocks is assembled from twelve octahedron subdivision blocks;
   a first six of said twelve octahedron subdivision blocks has an apex at a point corresponding with the center-of-gravity of said regular octahedron;
   a second six of said twelve octahedron subdivision blocks are identical with said six tetrahedron subdivision blocks;
   each of said second six of said twelve octahedron subdivision blocks has an apex at a point corresponding with the center-of-gravity of said regular tetrahedron;
   each of said first six of said twelve octahedron subdivision blocks has two edges of length a/2 and has four other edges of length "b", "c", "w" and "y";
   each of said six tetrahedron subdivision blocks has six edges of length a/2, "b", "w", "y", "k" and "n";
   thereby having three edges of each of said six tetrahedron subdivision blocks equal in length to three respective edges of each of said first six of said twelve octahedron subdivision blocks and having another edge of each of said six tetrahedron subdivision blocks equal in length to two respective edges of each of said first six of said twelve octahedron subdivision blocks; and
   said six tetrahedron subdivision blocks and said twelve octahedron subdivision blocks all have the same volume.

3. A geometric building block system as claimed in claim 2, in which:
   a/2 equals one-half of "a";
   "b" equals $a\sqrt{6}/4$;
   "c" equals $a/\sqrt{2}$;
   "w" equals $a/2\sqrt{2}$;
   "y" equals $a/2\sqrt{6}$;
   "k" equals $a/2\sqrt{3}$; and
   "n" equals $a/\sqrt{3}$.

4. The block system of claim 3 wherein the blocks exist in mirror-image forms.

5. The geometric block system of claim 2 wherein the blocks exist in mirror-image forms.

6. A sixteen-block geometric block system as claimed in claim 1, in which:
   said second, third, and fourth triangular faces of a first four of said eight identical first blocks have first, second and third different indicia thereon distinguishing them one from another; and
   said second, third, and fourth triangular faces of a second four of said eight identical first blocks have respective ones of said first, second and third different indicia thereon in reverse order relative to said second, third and fourth triangular faces of said first four of said eight identical first blocks.

7. Two sets of the block system of claim 1 in which two basic sets of blocks used in the system consist of 32 ¼ tetrahedron blocks and 32 ⅛ octahedron blocks.

8. Four sets of the block system of claim 1 in which four basic sets of blocks used in the system consist of 64 ¼ tetrahedron blocks and 64 ⅛ octahedron blocks.

9. The block system of claim 1 wherein respective faces of corresponding shapes are identified by the same color.

10. A geometric block system for constructing a regular rhombic dodecahedron having twelve identical rhombic-shaped faces, said system including at least sixteen blocks, said sixteen blocks consisting solely of:
    eight identical first blocks and
    eight identical second blocks;
    each of said eight identical first blocks being one quarter of a regular tetrahedron;
    said regular tetrahedron having six equal edges each of length "a" and having four identical equilateral triangular faces each having three sides each of length "a";
    each of said eight identical first blocks having an apex at a point corresponding with the center of gravity of said regular tetrahedron;
    each of said eight identical first blocks having four faces consisting of first, second, third and fourth triangular faces;
    said first triangular face being an equilateral triangular face having three edges each f length "a";
    said second, third and fourth triangular faces each being an isosceles triangular face having one edge of length "a" and two edges of length "b";
    said length "b" being equal to $a\sqrt{6}/4$;
    each of said eight identical first blocks having a volume of one cubic unit;
    each of said eight identical second blocks being one eight of a regular octahedron;
    said regular octahedron having eight equal edges each of length "a" and having eight identical equilateral triangular faces each having three sides each of length "a";

each of said eight identical second blocks having an apex at a point corresponding with the center of gravity of said regular octahedron;

each of said eight identical second blocks having four faces consisting of fifth, sixth, seventh and eighth triangular faces;

said fifth triangular faces being in equilateral triangular face having three edges each of length "a";

said sixth, seventh and eighth triangular faces each being an isosceles triangular face having one edge of length "a" and two edges of length "c";

said length "c" being equal to $a/\sqrt{2}$;

each of said eight identical second blocks having a volume of two cubic units;

said sixteen blocks enabling said regular rhombic dodecahedron to be assembled by initially placing in face-to-face relationship the sixth, seventh and eighth isosceles triangular faces of all of the eight identical second blocks with their edges of length "c" being aligned and with all of their apexes being adjacent one to another; and by subsequently placing in face-to-face relationship respective first equilateral triangular faces of said eight identical first blocks with respective fifth equilateral triangular faces of respective ones of said eight identical second blocks with the edges of length "a" of said first equilateral triangular faces being aligned with the edges of length "a" of said fifth equilateral triangular faces, whereby a regular rhombic dodecahedron having twenty four units of cubic volume and having twelve identical rhombic-shaped faces can be constructed, in which each of said identical rhombic-shaped faces has four edges each of length "b" equal to $a\sqrt{6}/4$.

11. A geometric block system as claimed in claim 10 in which:

each of said identical first blocks is assembled from six tetrahedron subdivision blocks;

each of said six tetrahedron subdivision blocks is 1/24th of said regular tetrahedron;

each of said six tetrahedron subdivision blocks has an apex at a point corresponding with the center-of-gravity of said regular tetrahedron;

each of said identical second blocks is assembled from twelve octahedron subdivision blocks;

a first six of said twelve octahedron subdivision blocks has an apex at a point corresponding with the center-of-gravity of said regular octahedron;

a second six of said twelve octahedron subdivision blocks are identical with said six tetrahedron subdivision blocks;

each of said second six of said twelve octahedron subdivision blocks has an apex at a point corresponding with the center-of-gravity of said regular tetrahedron;

each of said first six of said twelve octahedron subdivision blocks has two edges of length a/2 and has four other edges of length "b", "c", "w" and "y";

each of said six tetrahedron subdivision blocks has six edges of length a/2, "b", "w", "y", "k" and "n";

thereby having three edges of each of said six tetrahedron subdivision blocks equal in length to three respective edges of each of said first six of said twelve octahedron subdivision blocks and having another edge of each of said six tetrahedron subdivision blocks equal in length to two respective edges of each of said first six of said twelve octahedron subdivision blocks; and said six tetrahedron subdivision blocks and said twelve octahedron subdivision blocks all have the same volume.

12. A geometric building block system as claimed in claim 11, in which:

a/2 equals one-half of "a";
"b" equals $a\sqrt{6}/4$;
"c" equals $a/\sqrt{2}$;
"w" equals $a/2\sqrt{2}$;
"y" equals $a/2\sqrt{6}$;
"k" equals $a/2\sqrt{3}$; and
"n" equals $a/\sqrt{3}$.

13. The block system of claim 12 wherein the blocks exist in mirror-image forms.

14. The geometric block system of claim 11 wherein the blocks exist in mirror-image forms.

15. A sixteen-block geometric block system as claimed in claim 10, in which:

said second, third, and fourth triangular faces of a first four of said eight identical first blocks have first, second and third different indicia thereon distinguishing them one from another; and said second, third, and fourth triangular faces of a second four of said eight identical first blocks having respective ones of said first, second and third different indicia thereon in reverse order relative to said second, third and fourth triangular faces of said first four of said eight identical first blocks.

16. Two sets of the block system of claim 10 in which two basic sets of blocks used in the system consist of 32 ¼ tetrahedron blocks and 32 ⅛ octahedron blocks.

17. The geometric block system of claim 10 including one hundred twenty-eight blocks, said system consisting of:

64 ¼ tetrahedron blocks and 64 ⅛ octahedron blocks.

18. The block system of claim 10 wherein respective faces of corresponding shapes are identified by the same color.

* * * * *